US010853893B2

United States Patent
Grant et al.

(10) Patent No.: US 10,853,893 B2
(45) Date of Patent: Dec. 1, 2020

(54) SYSTEM AND METHOD FOR AUTOMATICALLY CORRELATING GEOLOGIC TOPS

(71) Applicant: Drilling Info, Inc., Austin, TX (US)

(72) Inventors: Christian W. Grant, Austin, TX (US); Stefan Compton, Austin, TX (US); Dean Witte, Austin, TX (US)

(73) Assignee: Drilling Info, Inc., Austin, TX (US)

( * ) Notice: Subject to any disclaimer, the term of this patent is extended or adjusted under 35 U.S.C. 154(b) by 0 days.

(21) Appl. No.: 15/487,393

(22) Filed: Apr. 13, 2017

(65) Prior Publication Data

US 2018/0225778 A1    Aug. 9, 2018

Related U.S. Application Data

(63) Continuation-in-part of application No. 14/254,718, filed on Apr. 16, 2014, now Pat. No. 10,459,098.

(60) Provisional application No. 61/813,124, filed on Apr. 17, 2013.

(51) Int. Cl.
   *G06Q 50/02*   (2012.01)
   *G06Q 10/06*   (2012.01)

(52) U.S. Cl.
   CPC ....... *G06Q 50/02* (2013.01); *G06Q 10/06395* (2013.01)

(58) Field of Classification Search
   None
   See application file for complete search history.

(56) References Cited

U.S. PATENT DOCUMENTS

| 4,633,400 | A |   | 12/1986 | Chittineni |
| 5,003,813 | A |   | 4/1991  | Hayes |
| 5,056,066 | A |   | 10/1991 | Howard |
| 5,835,882 | A |   | 11/1998 | Vienot et al. |
| 5,987,388 | A |   | 11/1999 | Crawford |
| 6,003,027 | A | * | 12/1999 | Prager ............ G06F 16/35 |
| 6,223,126 | B1|   | 4/2001  | Neff et al. |

(Continued)

FOREIGN PATENT DOCUMENTS

| CN | 1797039   | 7/2006 |
| CN | 102066980 | 5/2011 |

(Continued)

OTHER PUBLICATIONS

Automatic Method for Correlating Horizons across Faults in 3D Seismic Data, In Proceedings of the IEEE Conference on Computer Vision and Pattern Recognition, Washington DC, Jun. 2004.*

(Continued)

*Primary Examiner* — Gregory J Toatley, Jr.
*Assistant Examiner* — Brandon J Becker
(74) *Attorney, Agent, or Firm* — Fish & Richardson P.C.

(57) ABSTRACT

A system and method are provided for automatically correlating geologic tops. The system receives well logs from different well bores and each of the picks is added to a priority queue ordered by each pick's quality measure. User selected picks are assigned the highest level of quality measure. The system performs correlation by selecting a window of well log data about a pick selected from the top of the priority queue and then finding the best optimal match with a corresponding window in a neighboring wellbore.

24 Claims, 18 Drawing Sheets

(56) References Cited

U.S. PATENT DOCUMENTS

| | | | |
|---|---|---|---|
| 6,295,504 B1* | 9/2001 | Ye | G06K 9/622 |
| | | | 702/11 |
| 6,965,383 B2 | 11/2005 | Ritter | |
| 7,054,753 B1 | 5/2006 | Williams et al. | |
| 7,069,149 B2 | 6/2006 | Goff | |
| 7,516,055 B2* | 4/2009 | Strebelle | G01V 1/30 |
| | | | 703/10 |
| 7,525,349 B2 | 4/2009 | Mavoori et al. | |
| 8,265,876 B1 | 9/2012 | Yu et al. | |
| 8,265,879 B2* | 9/2012 | Kurnik | G06F 19/24 |
| | | | 702/19 |
| 8,826,879 B2 | 9/2014 | Lee | |
| 9,182,511 B2 | 11/2015 | Neave | |
| 9,418,339 B1 | 8/2016 | Leonard | |
| 9,618,639 B2 | 4/2017 | Witte et al. | |
| 10,459,098 B2 | 10/2019 | Grant et al. | |
| 2002/0140699 A1 | 10/2002 | Miyadai | |
| 2002/0184083 A1* | 12/2002 | Nakano | G06Q 10/06393 |
| | | | 705/7.39 |
| 2004/0015296 A1 | 1/2004 | Causse et al. | |
| 2004/0220790 A1 | 11/2004 | Cullick et al. | |
| 2004/0260476 A1 | 12/2004 | Borgos et al. | |
| 2005/0209897 A1* | 9/2005 | Luhr | G06Q 40/00 |
| | | | 705/7.28 |
| 2006/0052937 A1 | 3/2006 | Zoraster et al. | |
| 2006/0075007 A1 | 4/2006 | Anderson | |
| 2006/0193205 A1* | 8/2006 | Herkenhoff | G01V 1/362 |
| | | | 367/47 |
| 2006/0274386 A1 | 12/2006 | Wakazono et al. | |
| 2007/0276604 A1 | 11/2007 | Williams | |
| 2008/0033935 A1 | 2/2008 | Frank | |
| 2008/0178148 A1* | 7/2008 | Enyeart | G06Q 10/06393 |
| | | | 717/109 |
| 2009/0043507 A1 | 2/2009 | Dommisse et al. | |
| 2009/0125288 A1 | 5/2009 | Main et al. | |
| 2009/0141028 A1* | 6/2009 | Arora | G06Q 10/06 |
| | | | 345/440 |
| 2009/0144032 A1* | 6/2009 | Arora | G06F 17/10 |
| | | | 703/2 |
| 2009/0157319 A1 | 6/2009 | Mitchell | |
| 2009/0319243 A1 | 12/2009 | Suarez-rivera et al. | |
| 2010/0125349 A1 | 5/2010 | Abasov et al. | |
| 2010/0214870 A1 | 8/2010 | Pepper et al. | |
| 2011/0002194 A1 | 1/2011 | Imhof et al. | |
| 2011/0011595 A1 | 1/2011 | Huang et al. | |
| 2011/0042098 A1 | 2/2011 | Imhof | |
| 2011/0115787 A1 | 5/2011 | Kadlec | |
| 2011/0122136 A1 | 5/2011 | Jo | |
| 2011/0172976 A1 | 7/2011 | Budiman et al. | |
| 2011/0181610 A1 | 7/2011 | Baggs et al. | |
| 2011/0213577 A1 | 9/2011 | Mousavi et al. | |
| 2011/0313743 A1 | 12/2011 | Oury et al. | |
| 2012/0010865 A1 | 1/2012 | Benson | |
| 2012/0080197 A1 | 4/2012 | Dickens et al. | |
| 2012/0253770 A1 | 10/2012 | Stern et al. | |
| 2013/0090855 A1 | 4/2013 | Rasmus et al. | |
| 2013/0169644 A1 | 7/2013 | Bolton | |
| 2013/0229891 A1 | 9/2013 | Witte et al. | |
| 2013/0262052 A1 | 10/2013 | Mallet et al. | |
| 2013/0332131 A1* | 12/2013 | Russell | G06F 30/20 |
| | | | 703/10 |
| 2014/0140580 A1 | 5/2014 | Neave | |
| 2014/0142906 A1 | 5/2014 | Berezin et al. | |
| 2014/0222347 A1 | 8/2014 | Bashore | |
| 2014/0254884 A1 | 9/2014 | Elkington et al. | |
| 2014/0262246 A1 | 9/2014 | Li et al. | |
| 2014/0316706 A1 | 10/2014 | Grant et al. | |
| 2015/0098627 A1 | 4/2015 | Ye | |
| 2015/0198029 A1 | 7/2015 | Chen | |
| 2016/0139282 A1 | 5/2016 | Dimitrov | |
| 2016/0237810 A1 | 8/2016 | Beaman, Jr. et al. | |
| 2017/0108614 A1 | 4/2017 | Neave et al. | |
| 2018/0253873 A1 | 9/2018 | Witte et al. | |

FOREIGN PATENT DOCUMENTS

| | | |
|---|---|---|
| WO | WO 2010/110824 | 9/2010 |
| WO | WO 2011/100009 | 8/2011 |

OTHER PUBLICATIONS

Extracting time-ordered pairs of similar subsequences by time warping approach, Aug. 22, 2004.*
PCT/US13/68348, PCT International Search Report dated Apr. 29, 2014 (3 pgs.).
PCT/US13/68348, PCT Written Opinion of the International Searching Authority dated Apr. 29, 2014 (4 pgs.).
PCT/US13/68348, PCT International Preliminary Report on Patentability dated May 5, 2015 (5 pgs.).
PCT/US13/68349, PCT International Search Report dated Jan. 30, 2014 (3 pgs.).
PCT/US13/68349, PCT Written Opinion of the International Searching Authority dated Jan. 30, 2014 (5 pgs.).
PCT/US13/70838, PCT International Search Report dated Apr. 9, 2014 (3 pgs.).
PCT/US13/70838, PCT Written Opinion of the International Searching Authority dated Apr. 9, 2014 (5 pgs.).
PCT/US13/70838, PCT International Preliminary Report on Patentability dated May 26, 2015 (6 pgs.).
PCT/US14/34546, PCT International Search Report dated Sep. 22, 2014 (3 pgs.).
PCT/US14/34546, PCT Written Opinion of the International Searching Authority dated Sep. 22, 2014 (8 pgs.).
PCT/US14/34546, PCT International Preliminary Report on Patentability dated Oct. 7, 2014 (12 pgs.).
Admasu et al., *Automatic Method for Correlating Horizons Across Faults in 3d Seismic Data*, Computer Vision and Pattern Recognition, 2004, CVPR 2004, Proceedings of the 2004 IEEE Computer Society Conference, vol. 1 (6 pgs.).
Andersen, et al., *Seismic Waveform Classification: Techniques and Benefits*, dated Mar. 2004; pp. 26-29; (4 pgs.).
Aurnhammer et al., *A Genetic Algorithm for Automated Horizon Correlation Across Faults in Seismic Images*, IEEE Transactions on Evolutionary Computation, vol. 9., No. 2, Apr. 2005 (10 pgs.).
Brown et al., *Seismic Event Tracking by Global Path Optimization*, 76th Annual International Meeting, SEG, Expanded Abstracts, 1063-1067, 2006 (4 pgs).
Can, *Probabilistic Performance Forecasting for Unconventional Reservoirs with Stretched-Exponential Model*, Diss. Texas A&M University, May 2011 (74 pgs.).
Castro de Matos, et al., *Unsupervised Seismic Facies Analysis Using Wavelet Transform and Self-Organizing Maps*, dated Dec. 13, 2006; vol. 72, No. 1, pp. P9-P21, 19 Figs. (13 pgs.).
Chang et al., *NMR Characterizations of Properties of Heterogeneous Media*, Research Report, Final Report; U.S. Dept. of Energy, DOE Award No. DE-AC26-99BC15202, Texas A&M University, 2005, pp. 1-151 (151 pgs.).
Coleou, et al.; *Unsupervised Seismic Facies Classification: A Review and Comparison of Techniques and Implementation*, The Leading Edge, dated Oct. 2003; pp. 942-953; (7 pgs.).
Diersen et al., *Classification of Seismic Windows Using Artificial Neural Networks*, dated 2011; pp. 1-10 (10 pgs.).
Dijkstra; *A Note on Two Problems in Connexion with Graphs*, Numerische Mathematik 1, pp. 269-271, dated Jun. 11, 1959 (3 pgs.).
Forth et al., *Application of Statistical Analysis to Optimize Reservoir Performance*, Journal of Canadian Petroleum Technology, Sep. 1, 1997 (7 pgs.).
Herrera, *Automated Seismic-to-well Ties?*, 7th EAGE Conference & Exhibition incorporating SPE EUROPEC 2012, Jun. 1, 2012 (5 pgs.).
Hintze, J.L.. *NCSS Data Analysis User's Guide III, Regression and Curve Fitting*, NCSS 2007. Retrieved from http://ncss.wpengine.netdna-cdn.com/wp-content/uploads/2012/09/NCSSUG3.pdf (653 pgs.).

(56) References Cited

OTHER PUBLICATIONS

Hollt, et al., *Interactive Seismic Interpretation with Piecewise Global Energy Minimization*, dated Mar. 1, 2011, pp. 59-66 (8 pgs.).
Jeong, et al.; *A Fast Iterative Method for Eikonal Equations*, SIAM J. Sci. Comput., vol. 30, No. 5, pp. 2512-2534, dated Jul. 23, 2008 (23 pgs.).
Kass et al., *Snakes: Active Contour Models*, International Journal of Computer Vision, 321-331, 1988 (11 pgs).
Mortensen et al., *Interactive Segmentation with Intelligent Scissors*, Graphical Models and Image Processing, 60(5):349-384 (1998) (48 pgs).
Ouenes, Ahmed, et al., *Practical Use of Neural Networks in Tight Gas Fractured Reservoirs: Application to the San Juan Basin*, Paper SPE 39965 (1998) (8 pgs.).
Pages from Website: http://www.neuralog.com/pages/NeuraLog.html, printed Dec. 3, 2015 (2 pgs).
Roy, et al., *Automatic Seismic Facies Classification with Kohonen Self Organizing Maps—a Tutorial*, dated Dec. 2010; pp. 6-14; (9 pgs.).
Valk et al., *Investigation of Key Parameters in SAGD Wellbore Design and Operation*, Journal of Canadian Petroleum Technology, vol. 46, No. 6, Jun. 2007 (8 pgs.).
Welch et al. *Free Form Shape Design Using Triangulated Surfaces*, Computer Graphics, 28, Proc. SIGGRAPH '94, 1994 (preprint) (10 pgs).
Wikipedia. Wikipedia, Overfitting. Revision from Aug. 23, 2012. pp. 1-3. Retrieved from http://en.wikipedia.org/w/index.php?title=Overfitting&oldid=508784472 (3 pgs.).
Yang, *Integrated Reservoir Description from Seismic, Well Log, to Production Data*, SPE 38381 © May 18, 1997 (9 pgs.).
Zoraster et al., *Curve Alignment for Well-to-Well Log Correlation*, SPE 90471, SPE Annual Technical Conference and Exhibition, Dec. 31, 2004 (6 pgs.).
Goshtasby "Chapter 2: Similarity and Dissimilarity Measures" 'Image Registration Principle, Tools and Methods, 2012, XVIII, pp. 7-66 (2012).
Morita et al. Extracting time-ordered pairs of similar subsequences by time warping approach, 3rd International Workshop on Mining Temporal and Sequential Data, Aug. 22, 2004 (12 Pages).
D J Lineman et al. Well-to Wall Log Correlation Using Knowledge Based Systems and Dynamic Depth War, dated Jan. 1, 1987.
T.J. Hastie et al., entitled, "Generalized additive models," Chapter 7, Statistical Models in S eds., (1992), (11 pgs.).
CN Office Action in Chinese Application No. 201480034483.5, dated Feb. 21, 2017, 21 pages (English translation).
Keogh et al., "Derivative Dynamic Time Warping," In Proc. of the First Intl. SIAM Intl. Conf. on Data Mining, Chicago, Illinois, 11 pages (2001).
Sakoe et al., "Dynamic programming algorithm optimization for spoken word," Transactions of Acoustics, Speech, and Signal Proc., vol. ASSP-26. pp. 43-49, (1978).
Muller, "Dynamic Time Warping," Information Retrieval for Music and Motion, 2007, 69-84.

* cited by examiner

SYSTEM AND METHOD FOR AUTOMATICALLY CORRELATING GEOLOGIC TOPS

PRIORITY CLAIM/RELATED APPLICATIONS

This application claims priority under 35 USC 120 and is a continuation in part of U.S. patent application Ser. No. 14/254,718 filed on Apr. 16, 2014 and titled "System and Method for Automatically Correlating Geologic Tops" which in turn claims the benefit under 35 USC 119(e) to U.S. Provisional Patent Application Ser. No. 61/813,124 filed on Apr. 17, 2013 and titled "System and Method for Automatically Correlating Geologic Tops", the entirety of all of which are incorporated herein by reference.

APPENDIX

Appendix A (8 pages) contains more details of a time warping method used in the method. Appendix A forms part of the specification and is incorporated herein by reference.

FIELD

Aspects of the present disclosure relate to a system and process for interpreting geologic formations using data acquired from a wellbore. More particularly, aspects of the present disclosure involve a computing system configured to assist an analyst to rapidly and accurately identify and model subterranean geologic formations in three-dimensions.

BACKGROUND

In geology and geology related fields, stratigraphy involves the study of the layers of rock and soil that make up the subterranean landscape. In the field of oil and gas exploration, the identification of the strata of an area is especially important because possible locations of oil and gas deposits may be identified from the stratum. Furthermore, the identification of faults is particularly important for not only identifying potential locations for resources, but for safely drilling wells. In order to identify the various strata in the subterranean landscape, geologists are tasked with reviewing geologic data in the form of well logs.

A well log is a record of the geologic formations that are penetrated by a wellbore. These well logs may then be analyzed by geologists to identify well tops, or stratigraphic contacts penetrated by the wellbore. Usually, well logs from an area such as an oil field or a portion of an oil field are displayed as a two or three-dimensional figure. The geologist starts at a well log in one well bore, identifies a well top, and identifies the corresponding well top in the same well log in other well bores. As oil fields increase in size, analyzing a three-dimensional collection of well logs with such conventional techniques becomes increasingly difficult and time consuming. Furthermore, as the number of well logs and well bores increase, the likelihood of achieving consistently accurate results decreases and different geologists may interpret the same data in a significantly different manner. Thus, these problems make currently existing methods for identifying geologic tops inaccurate, difficult and time consuming. It is with these and other issues in mind that various aspects of the present disclosure were developed.

DETAILED DESCRIPTION OF ONE OR MORE EMBODIMENTS

The disclosure is particularly applicable to a system and method for automatically correlating geologic tops using at least one process such as in a general purpose computing system as described below and it is in this context that the disclosure will be described. It will be appreciated, however, that the system and method has greater utility since the system and method may be implemented using other computer systems and models, such as a client server computer system, a mainframe computer system with a terminal, a standalone computer system, a cloud based computer system or a software as a service (SaaS) model. For example, in a SaaS model implementation of the system, the computing system would be one or more computing resources, such as one or more server computer or one or more cloud computing resources) in a backend component that has at least one processor that executes a plurality of lines of computer code so that the at least one processor implements the method described below. A user, using a different computing device such as a desktop computer, laptop computer, tablet computer and the like, may couple to the backend component over a communication path, such as a wired or wireless computer network, cellular network, etc., to upload seismic data to the backend component that performs the automatic correlation of the geologic tops and returns the results to the user in the form for user interface data that may be displayed by the user on the computing device.

According to one aspect, a system and method is provided for automatically correlating geologic tops using at least one processor. Implementations of the present disclosure involve a system and method for automatically correlating geologic tops. In particular, the present disclosure provides for a system and method that receives a suite of well logs and is able to automatically correlate a well top identified by a user across many well bores using the provided well logs. The well top identified by the user is designated as a "seed pick" that identifies a well top to be correlated. The system then utilizes the seed pick to find corresponding locations of well tops ("picks") in each of the provided well logs by performing dynamic time warping on the well logs.

Figure 1:
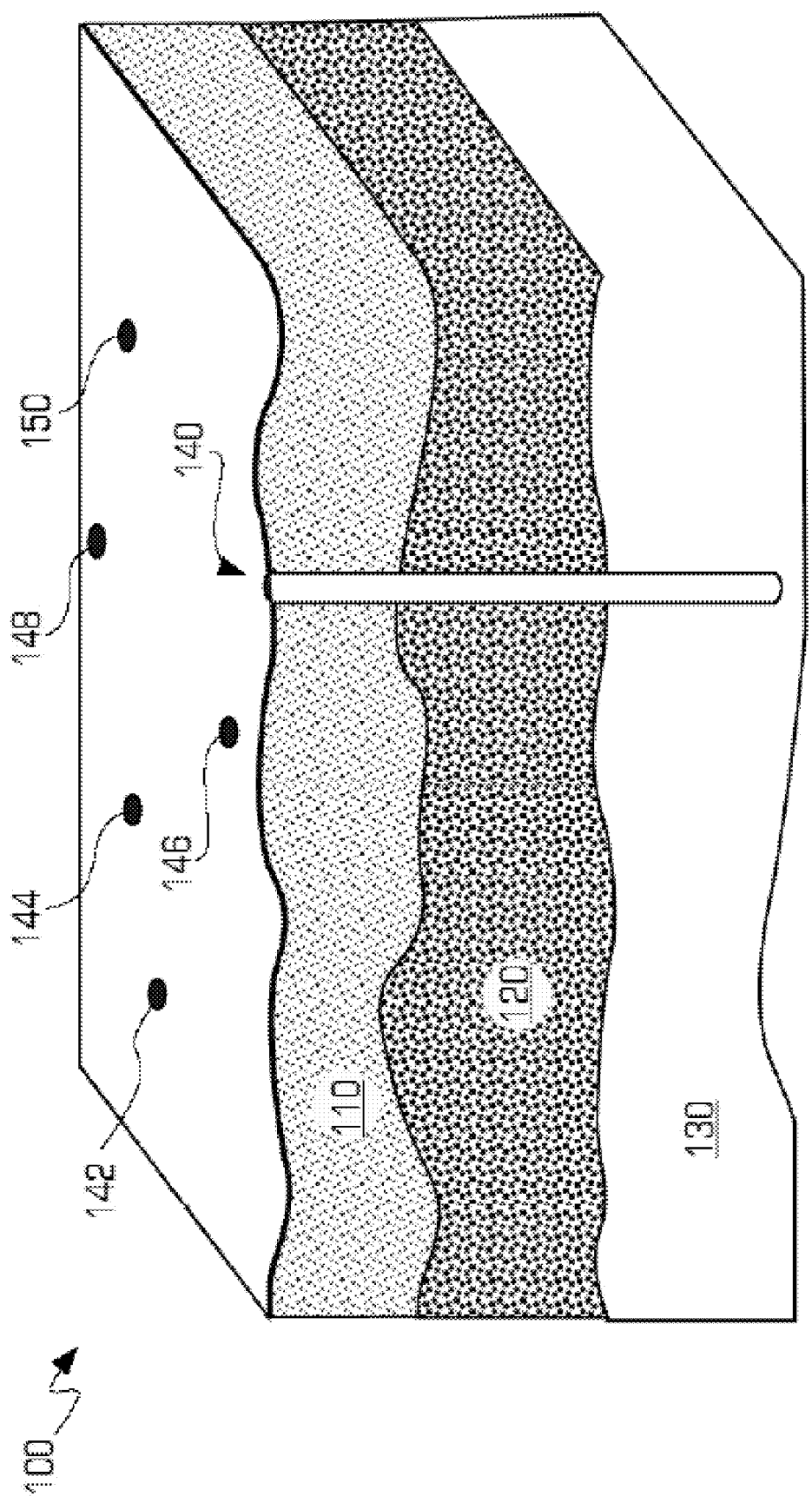
FIG. 1 depicts an example of wellbores penetrating strata in an oil field.

Referring to FIG. 1, an example oil field 100 is depicted. In this example, three layers of strata 110, 120, 130 are illustrated, but it should be understood that strata may vary in thickness from a few feet to tens of feet. Thus, a thousand foot deep well bore may penetrate hundreds of strata that may or may not have consistent thicknesses and may not be at consistent depths throughout the oil field 100. The depicted oil field 100 also includes many boreholes 140-150 penetrating the surface and passing through the strata.

Figure 2:
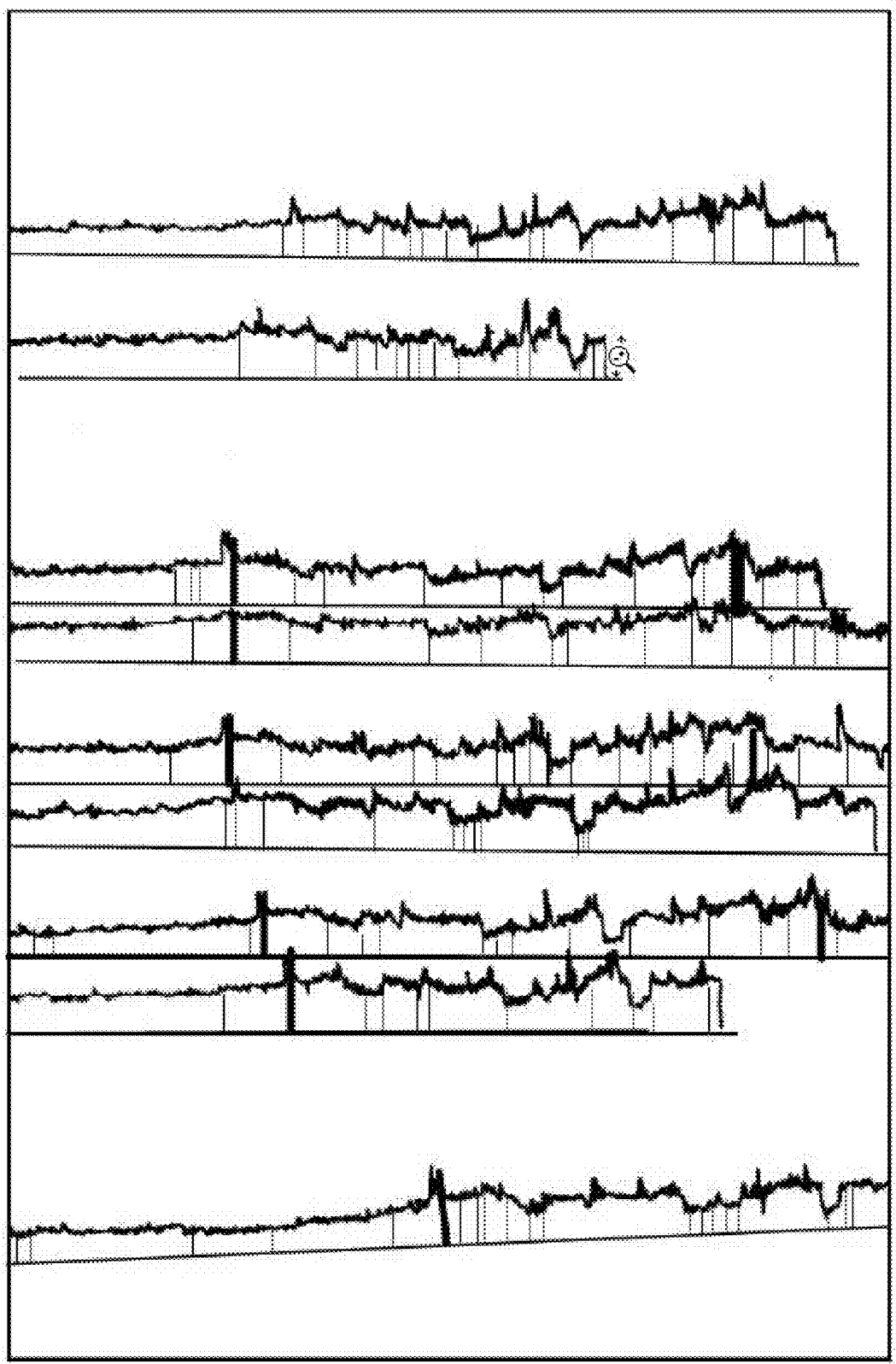
FIG. 2 depicts an example three-dimensional plot of well logs along with their respective well bores positioned according to location.

Referring to FIG. 2, an example of one well log taken at nine different well bores is depicted. In this example, the well logs are created by measuring various attributes of the underground formations. The diagram is in three-dimensions such that the well logs are spaced relative to their actual physical locations and the top of the diagram are measurements at ground level and depths decrease down the page. The varying widths in the well log signature represent the changing strata with depth. For example, depending on the composition of the strata, emitted gamma radiation may increase or decrease, resulting in a peak or a trough in the well log. The resulting measurements are then visually depicted as wider or narrower bars in the well logs. Thus, if a continuous area of a well log emits a similar amount of gamma radiation, the well log shows a consistent width. A geologist viewing the well log may then determine that that area is made up of a consistent layer of a certain type of strata and is a single well top.

Figure 3A:
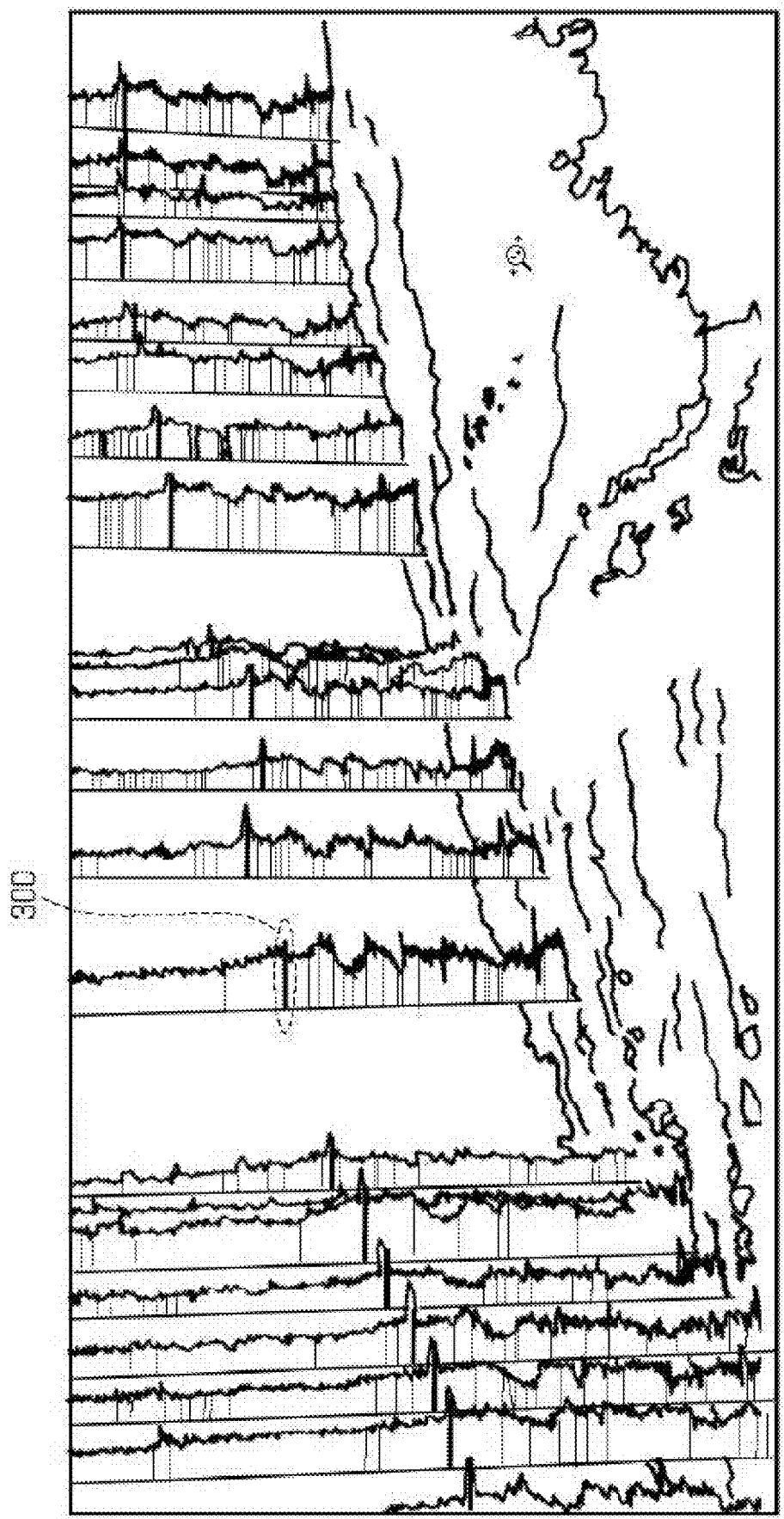
FIGS. 3A-3C each depict an example three-dimensional plot of well logs positioned according to location with a well top identified across multiple well logs.
Figure 3B:
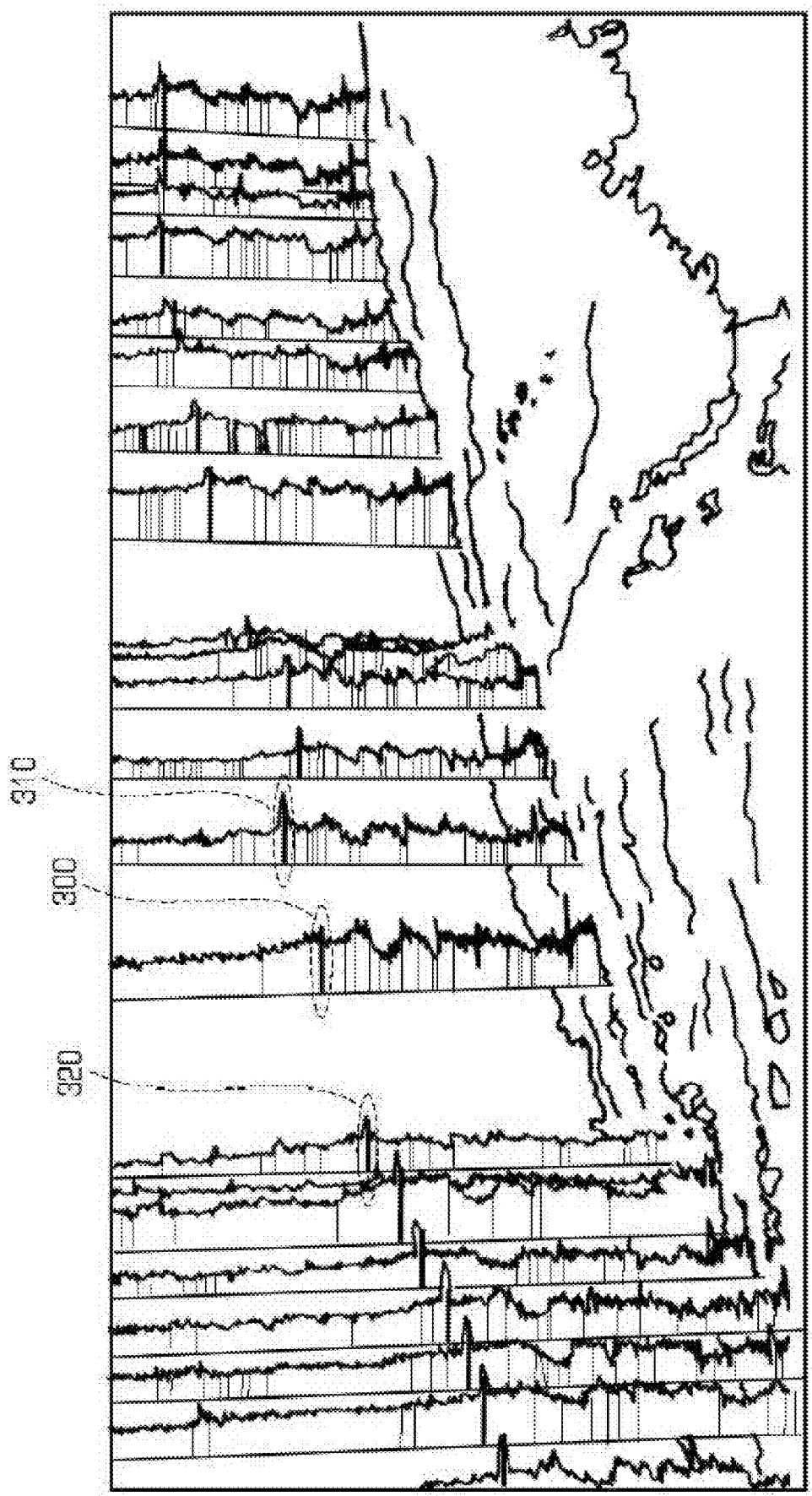
Figure 3C:
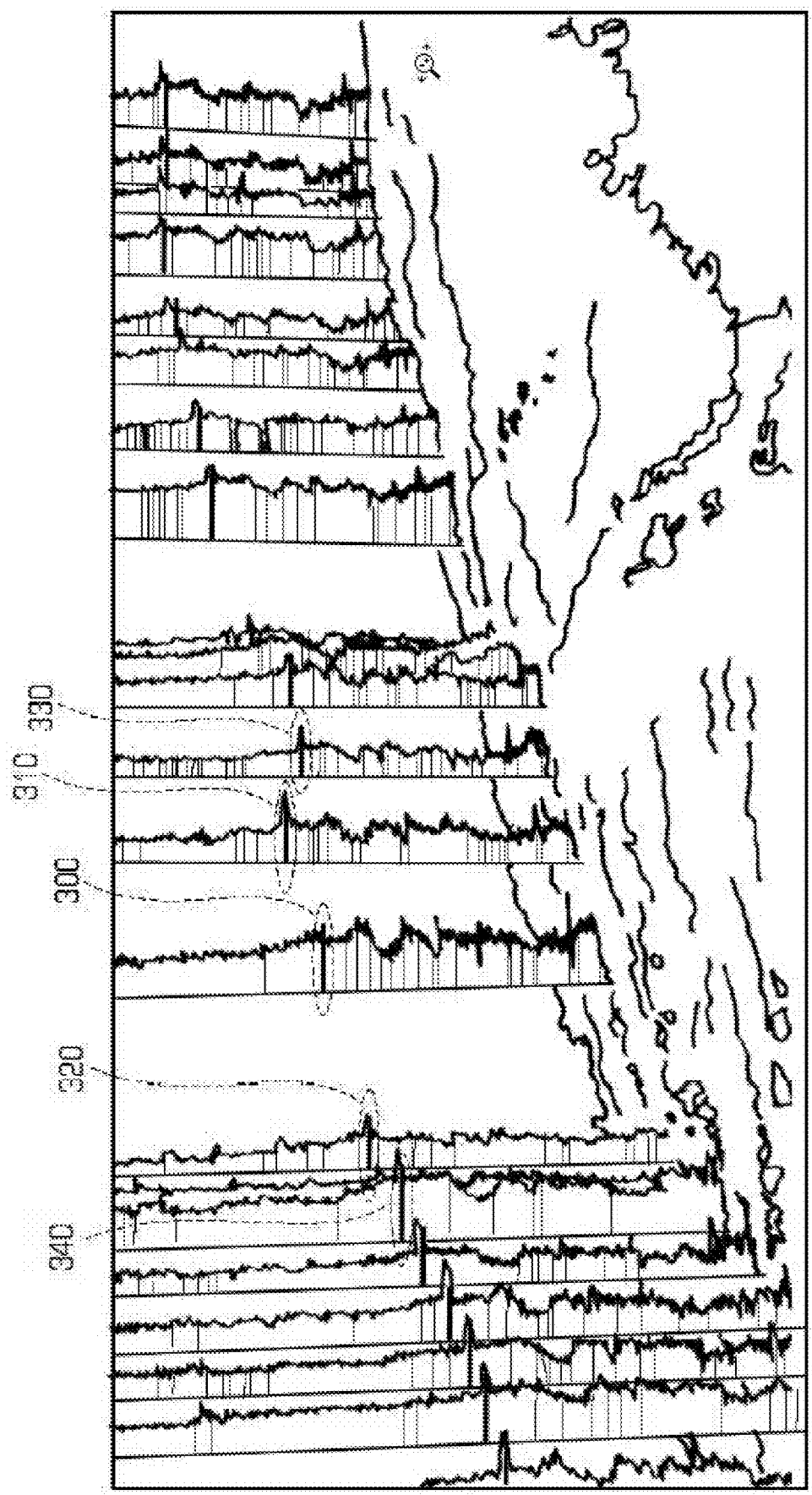

Referring to FIG. 3A, well logs are depicted with a seed pick 300 that has been selected by a user. The system operates by finding a location in the other well logs that corresponds to a seed pick 300. The user identifies a well top and selects that position of well log as a seed pick. The seed pick may be graphically illustrated by overlaying an indicator at the location of the well top on a well log. This may be done by starting at the well logs that are physically closest to the well bore with the seed pick. Each of the neighboring well bore's well logs are evaluated and picks corresponding to the seed pick are correlated for each well log. Each pick that is correlated is recorded and is also assigned a quality value based on how well it matches the seed pick and a monotonically non-increasing confidence value that is a combination of the seed pick's confidence and the new pick's quality. The process is then repeated using the pick with the highest quality value and correlating that pick with the well logs of its neighbors. The process is repeated with the highest confidence picks until a pick has been made at each well bore or until no remaining picks may be made (e.g. if the correlation fails). For example, referring to FIG. 3B, the seed pick 300 was used to pick the same well tops at a first correlated pick 310 and a second correlated pick 320. Referring now to FIG. 3C, the first and second picks 310, 320 may then be used to correlate a third pick 330 and a fourth pick 340. Thus, the system starts at the seed pick and then the correlation propagates through the well logs.

The above described systems for correlation well tops are inaccurate, difficult and time consuming which are problems with the existing techniques. Furthermore, some of the techniques are manual that contributes to the above problems. Unlike the known techniques described above, the disclosed system and method provides a technical solution to the above problems. The disclosed system and method include a plurality of lines of computer code/instructions that provide the technical solution. Furthermore, the disclosed system and method performs neighborhood searches, dynamic time warping and correlation processes that do not exist in the existing system including any manual systems and the neighborhood searches, dynamic time warping and correlation processes achieve better accuracy for correlating geologic well tops that was not possible with the existing systems and thus solves the problems of those existing systems and methods.

Figure 4:
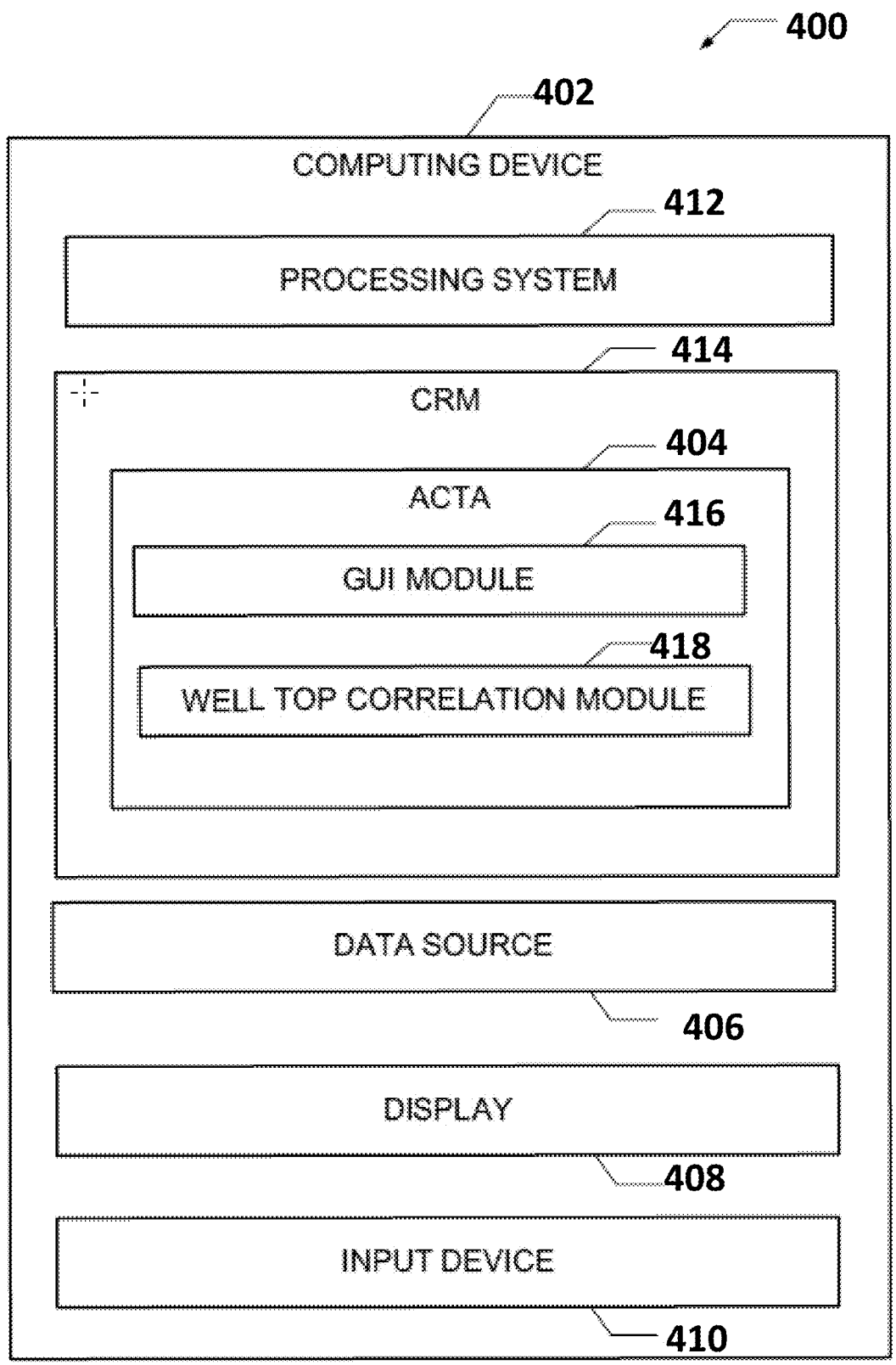
FIG. 4 illustrates an example of an implementation of a system for automatically correlating geologic tops.

FIG. 4 depicts an exemplary automated tops correlation system (ATCS) 700 that may perform an automatic geologic top correlation process described below. The ATCS 700 includes a computing device 402 or other computing device or system that includes an automated tops correlation element (ATCA) 404 that may be implemented in hardware or software. When the ATCA is implemented in hardware, the ATCA 404 may be implemented in an integrated circuit, programmed microcontroller, state machine, programmable logic device and like hardware devices so that the hardware device performs the processes of the automatic geologic tops correlation method. When the ATCA 404 is implemented in software, the ATCA 404 may be a plurality of lines of computer code/instructions that may be executed by a processing system 412 of the computing device 402 so that the processing system 412, such as a processor, is configured by the execution of the instructions/computer code to implement the processes of the automatic geologic tops correlation method.

The system 400 may also include a data source 406 that stores various data and/or instructions for the system including a plurality of well logs that are inputs to the automatic geologic tops correlation method. The data source 406 may be implemented as memory, persistent storage and/or a database that may be implemented in hardware or software. Although the data source 406 is illustrated as being located in/on the computing device 402, it is contemplated that the data source 406 may be a database that is located on another computing device or a computing system that is connected to the computing device 402.

The computing device 402 may be a laptop computer, a personal digital assistant, a tablet computer, a smart phone, standard personal computer, a server computer, a mainframe computer or another device that has at least one processing system 412. The computing device 402 may include a display 408, such as a computer monitor, LCD or other display, for displaying data and/or graphical user interfaces of the automatic geologic tops correlation process. The computing device 402 may also include one or more input and/or output devices 410, such as a keyboard or a pointing device (e.g., a mouse, trackball, pen, or touch screen) to interact with various data entry forms to submit image slice selection data and/or surface fault point input data or a printer to print the results of the automatic geologic tops correlation process.

According to one aspect, a displayed group of well logs is itself an entry form that is responsive to user input. For example, the user of the computing device 402 can interact with well logs to submit seed pick selection data by using the mouse to select a particular region of a well log. It is also contemplated that the user may submit seed pick selection data by interacting with one or more displayed fields (not shown) to enter coordinates corresponding to a particular section of a well log. After entering the seed pick selection data, a seed pick selection request is generated and provided to the ATCA 404 for processing. Furthermore, in the example user interfaces described below in more detail, the user may enter data/information into the user interface screens that are part of the automatic geologic tops correlation process.

According to one aspect, a displayed well log is itself another entry form that is responsive to user input. For example, the user of the computing device 402 can interact with the displayed well log to submit seed pick input data by using the mouse to select at least one particular point on the well log. It is also contemplated that the user may submit seed pick input data by interacting with one or more displayed fields (not shown) to enter coordinates corresponding to the at least one particular points. After entering and submitting seed pick input data, a well top correlation request is generated and provided to the ATCA 404 for processing.

Although the system 400 is depicted in FIG. 4 as being implemented on a single computing device, it is contemplated that the ATCA 404 may be executed by a server computing device (not shown) that receives the seed pick selection request, the well log selection request, and/or other input data from a remote client computer (not shown) via a communication network, such as the Internet. Alternatively, the ATCA 404 may be implemented using a cloud computing architectures or the client server architecture described above or any other computing device architecture since the system and method is not limited to any particular computing device or computing system architecture.

According to one aspect, the computing device 402 may include the processing system 412 that includes one or more processors or other processing devices, a memory and the like. The computing device 402 also includes a computer readable medium ("CRM") 414, such as a memory like a DRAM, SRAM, or persistent storage device, etc., configured with the ATCA 404. In a software implementation, the ATCA 404 includes instructions or modules that are executable by the processing system 412 to perform interpretation on well tops in well logs. When the plurality of instructions/computer code of the ATCA 404 are executed by a processor, the processor is thus configured to perform the processes of the automated geologic top correlation as described below. The ATCA 404 may also be implemented in a hardware device, an appliance, a microcontroller, etc., that performs the operations and functions of the automated geologic top correlation as described below.

The CRM 414 may include volatile media, nonvolatile media, removable media, non-removable media, and/or another available medium that can be accessed by the computing device 400. By way of example and not limitation, the CRM 414 comprises computer storage media and communication media. Computer storage media includes nontransient memory, volatile media, nonvolatile media, removable media, and/or non-removable media implemented in a method or technology for storage of information, such as computer readable instructions, data structures, program modules, or other data. Communication media may embody computer readable instructions, data structures, program modules, or other data and include an information delivery media or system.

The ATCA 404 may further include a graphical user interface (GUI) module 416 that displays a plurality of well logs received from, for example, the data source 406 in response to a well log retrieval request. The well log retrieval request is generated, for example, by a user of the computing device 402 interacting with a well log retrieval request (not shown). The GUI module 416 may also generate and display the user interface that are presented to the user in connection with the automatic geologic tops correlation process. As described above, the well logs each contain a plurality of measurements compiled into a three-dimensional image. The GUI modules 416 may display a particular well logs or group of well logs, such as described above below in response to a seed pick selection request.

The ATCA may further include a well top correlation module 418 that generates indicators of a well top by performing the automatic geologic tops correlation process described below. The well top indicators correspond to the well tops designated by user selected seed picks at least a first location on a first well log as described below. The well top correlation module 418 may be a plurality of lines of computer code/instructions that may be executed by a processor with memory so that the processor is configured to perform the operations and functions of the automatic geologic tops correlation process. According to one aspect, the well top correlation module 418 may perform the various processes of the automatic geologic tops correlation process as described below and may also cause the GUI module 416 to generate the user interfaces displayed to the user during the automatic geologic tops correlation process.

Figure 5A:
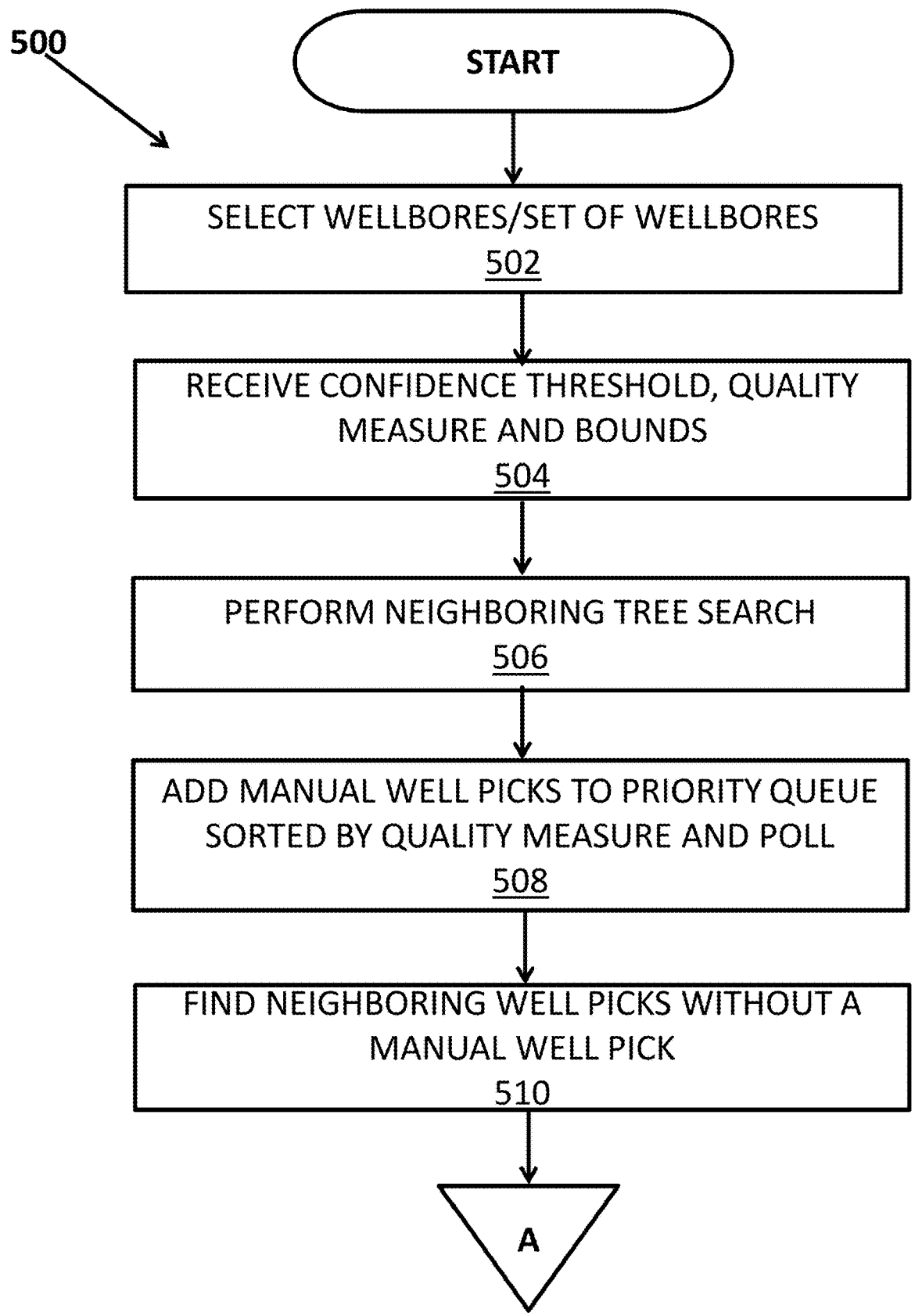
FIGS. 5A-5C illustrate a method for automatically correlating geologic tops.
Figure 5B:
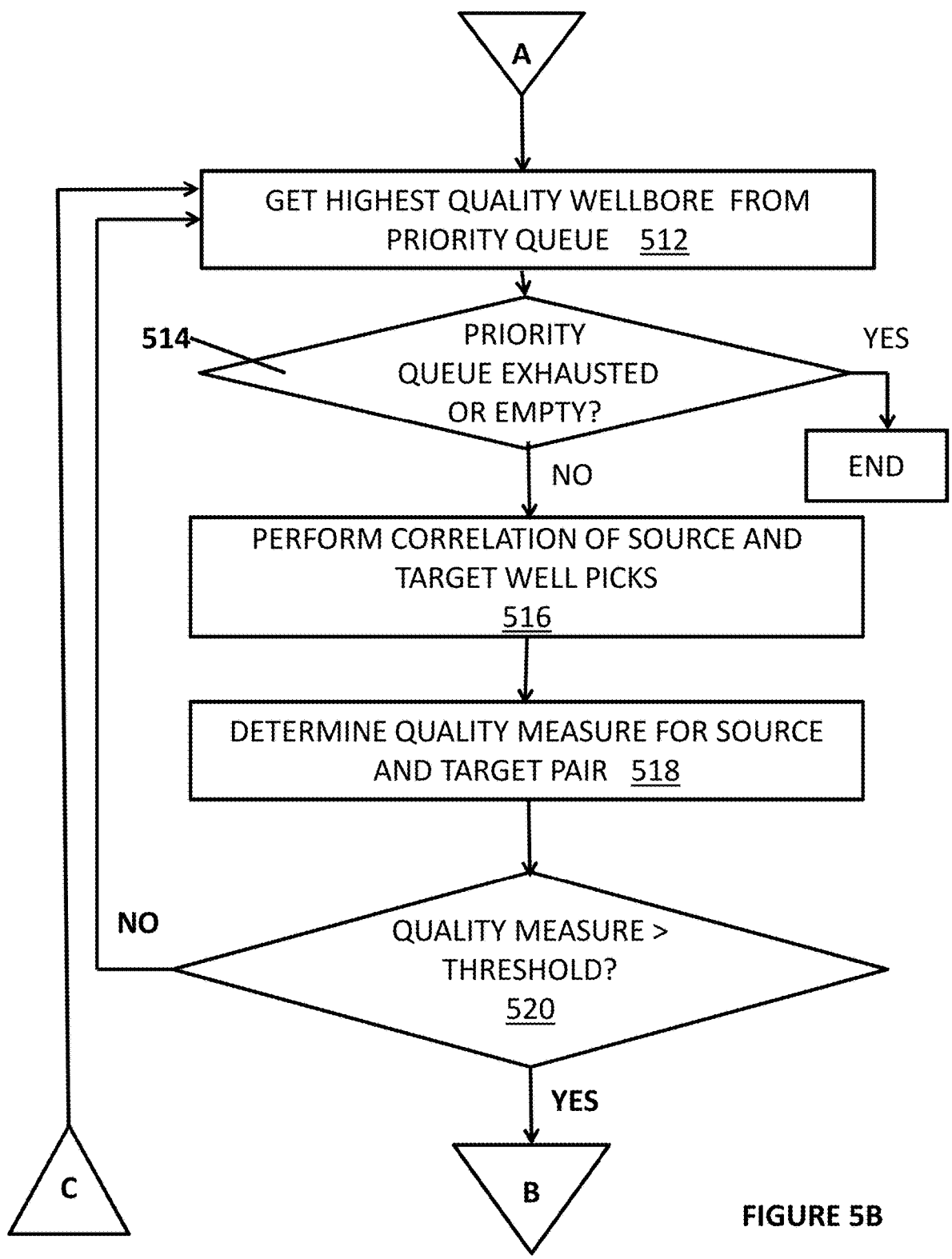
Figure 5C:
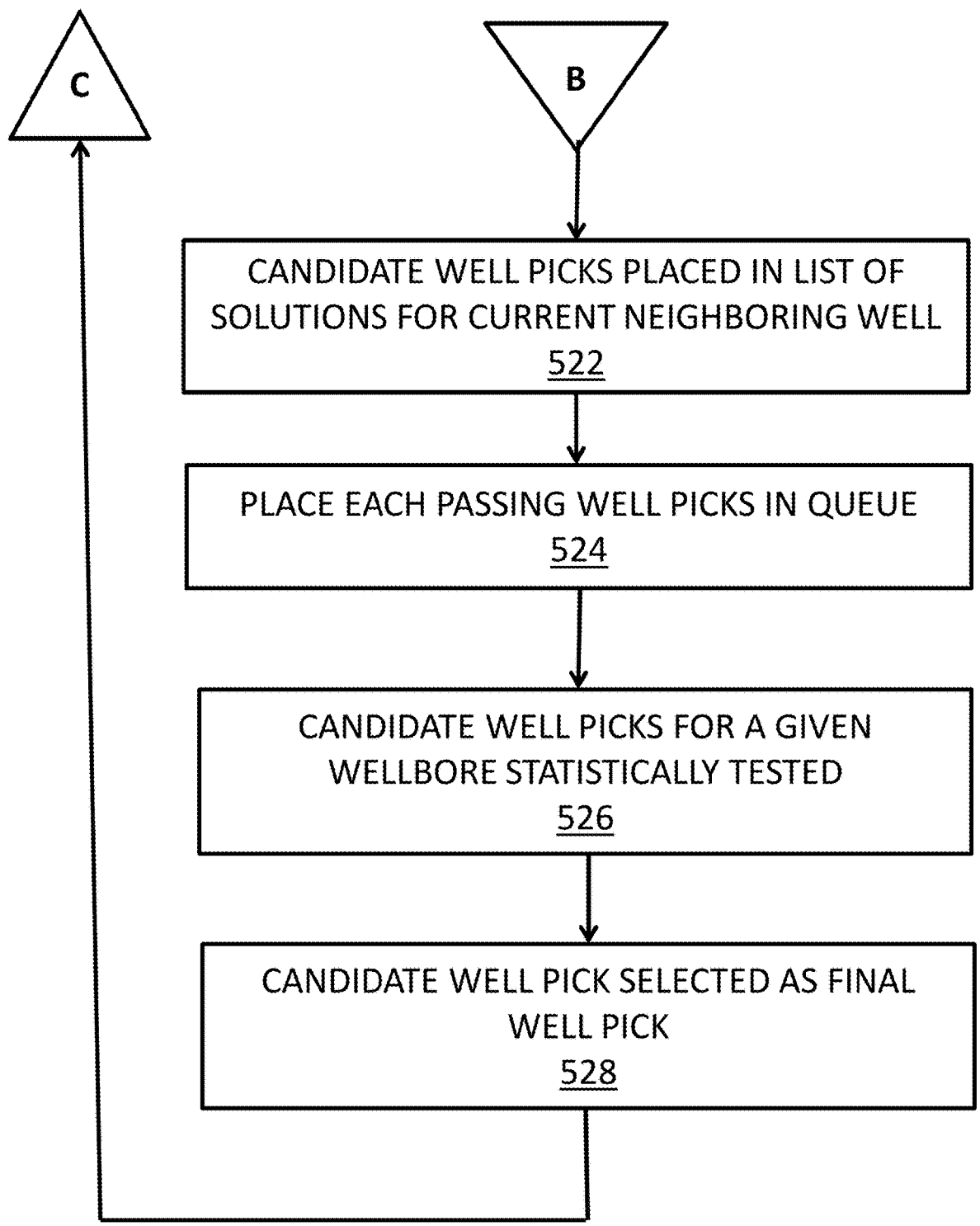
Figure 10:
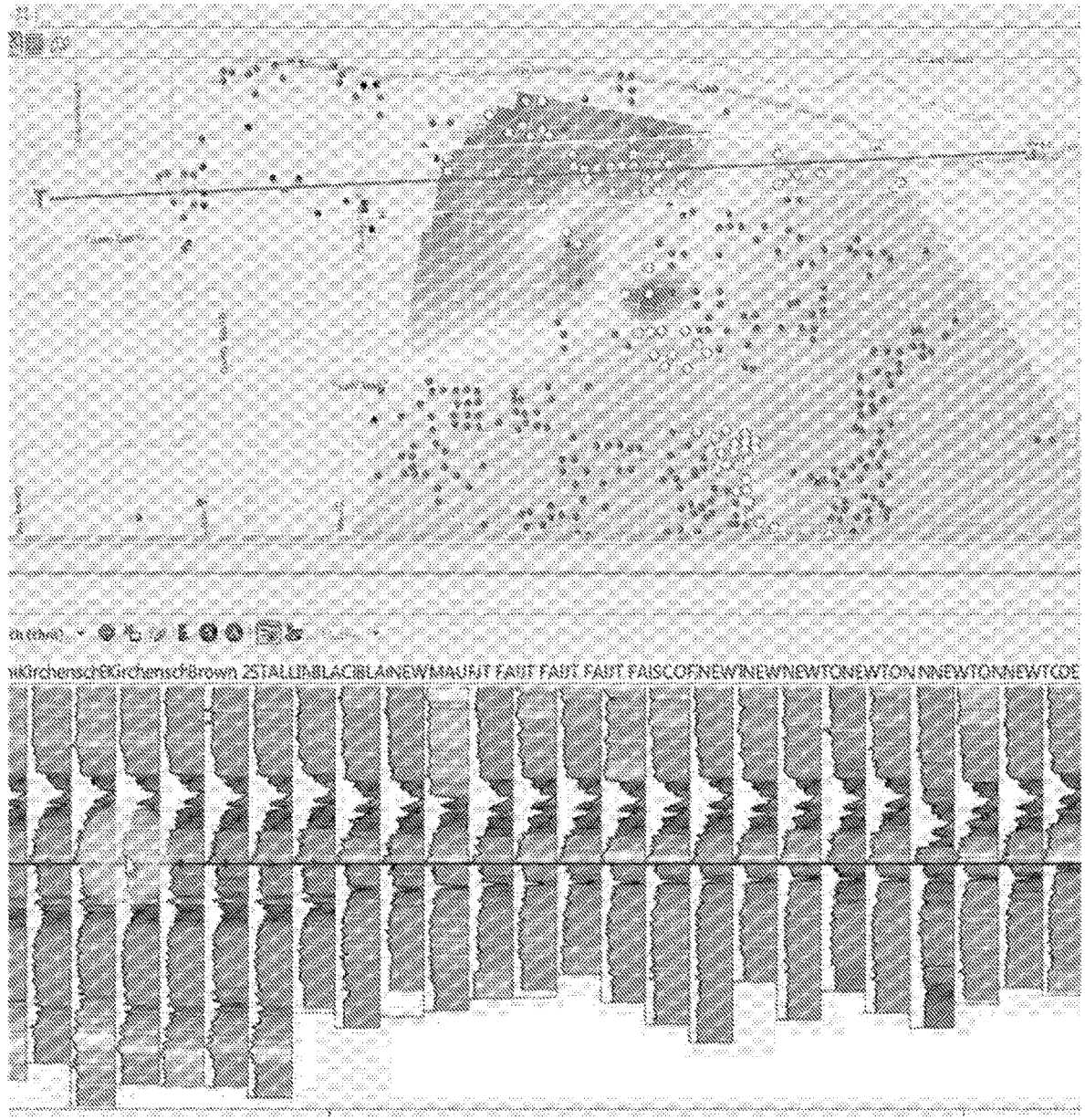
FIG. 10 illustrates an example of a 2D map flood user interface that may be generated by the GUI module of the system for automatically correlating geologic tops.

FIGS. 5A-5C illustrate a method 500 for automatically correlating geologic tops. The method shown may be implemented by the ACTA 404 or the well top correlation module 418 or any other computer system/processor that is capable of performing the processes shown in FIGS. 5A-5C. In the method, particular wells (each having a wellbore and wellbore data) may be selected to be correlated or a set of existing wells (well picks) may be selected (502) so that one or more well picks are selected. In one embodiment, the existing set of tops may be identified by a 'Name' and an 'Interpreter'. The existing set of Well Picks usually are 'Manual' and have a quality/confidence of 100% (100% accurate) or are also considered to be 'hard data.' Each well Pick is uniquely defined by a name, interpreter, and geologic occurrence. As part of this process, a group of wellbores is selected for Well Pick correlation. The selection may be either done through a cross section-transect, a selection of wellbores in 2D basemap view, or a 3D scene of wellbores. The group of wells must have at least one or more well logs present. The cross section-transect, the 2D basemap view (an example of which is shown in FIG. 10), or the 3D scene of wellbores may be generated, for example, by the GUI module 416 shown in FIG. 4. Also during this process, the method, from the selected Wellbores with Well Logs and defined Well Top, may loop over all wellbores and find out which wellbores have a manual well pick. This process may be performed by the well top correlation module 418, for example. The result of process 502 is a collection of wellbores that have a manual well pick.

In the method, the user may optionally provide limits and thresholds for the process (504). For example, the system may receive a minimum confidence threshold for automatically selected picks. Similarly, the system may receive a minimum quality threshold for automatically selected picks. The thresholds may include vertical threshold values and areal/lateral threshold values. The vertical thresholds control the 'half window length' and this controls how much of a pattern to correlate using the method since a larger window results in larger pattern being correlated using the system. Typically this leads to more accurate results at the cost of more compute time. The later threshold window determines how far out to search for data. This threshold may determine how far out the correlation will continue. If the search is set too far, then it may include data in a real sense that is not appropriate for the current correlation. There are also thresholds around the quality measure. If this threshold is not met, then the TRG wells (described in more detail below) will be dropped from the queue. If this threshold is set too low, then this TRG may remain on the queue. By remaining on the quality queue with a low threshold, the well picks can result in poorly picked Well Picks.

The user may also optionally provide the system with limits for confining the correlation analysis to certain stratigraphic information, such as, for example, a certain stratigraphic interval. For example, the user may elect to correlate a well top that is located at a higher depth than the first well top. In this case, there's no need to perform correlation across the entire well logs since the well top being correlated will be located above the first well top. Likewise, the correlation may be confined to below a second well top or between the well tops. The correlation may also be databounded according to a structural model where well logs are aligned in a Wheeler transform domain or 'palinspastically-restored space'. The user may also create bounds for the correlation using previously correlated well tops.

Figure 6:
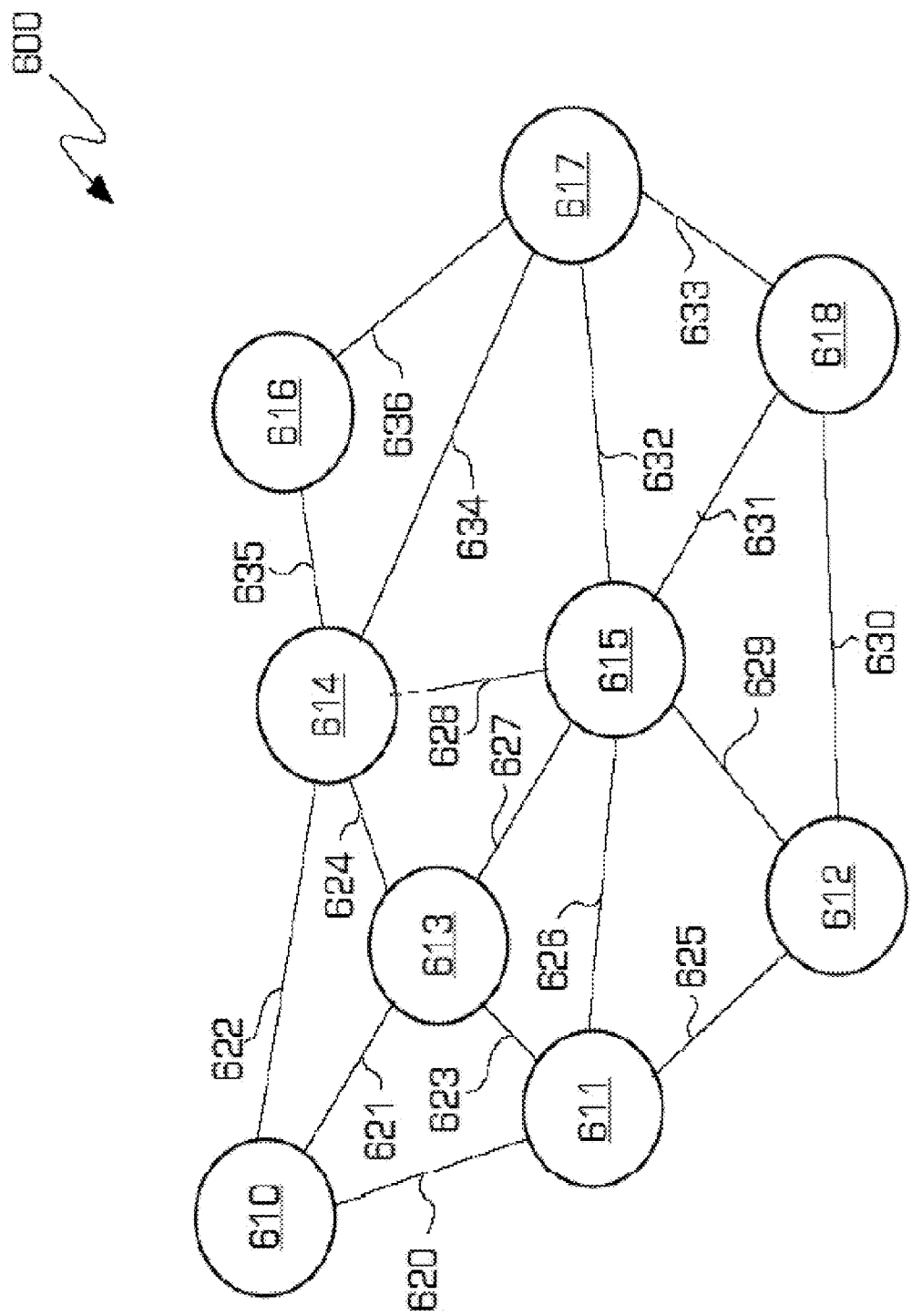
FIG. 6 illustrates an example of a search tree.

The method may now perform a neighboring tree search (506). Thus, from this collection of wellbores, a neighboring search tree may be set up. This allows the well top correlation process to rapidly find neighbor points and, from those neighbor points, their corresponding neighbors and so on. This may be done by constructing a graph based on the locations of each wellbore. For instance, the system may use the locations of each wellbore to create a weighted graph where the distances between nodes may be assigned according to the physical locations of each well. FIG. 6 provides an illustrative example of how the locations of node's 610-618 are positioned according to their physical locations relative to each other. The graph 600 may initially be a complete weighted graph where each pair of the vertices is connected by a distinct weighted edge and the edge weight is assigned according to the distance between the vertices. Then, using the locations of the vertices, the system may determine which nodes are natural neighbors using any natural neighbor selection method. For example, the system may perform Delaunay triangulation to determine the natural neighbors of each node by making edge connections that form triangles with circumcircles (circles that connect three vertices that form a triangle) that do not contain any nodes. For example, FIG. 6 only illustrates edges 620-652 connecting each pair of vertices that are natural neighbors according to Delaunay triangulation. Other graph connection strategies can be contemplated and are easily incorporated into the well log correlation algorithm.

Figure 7:
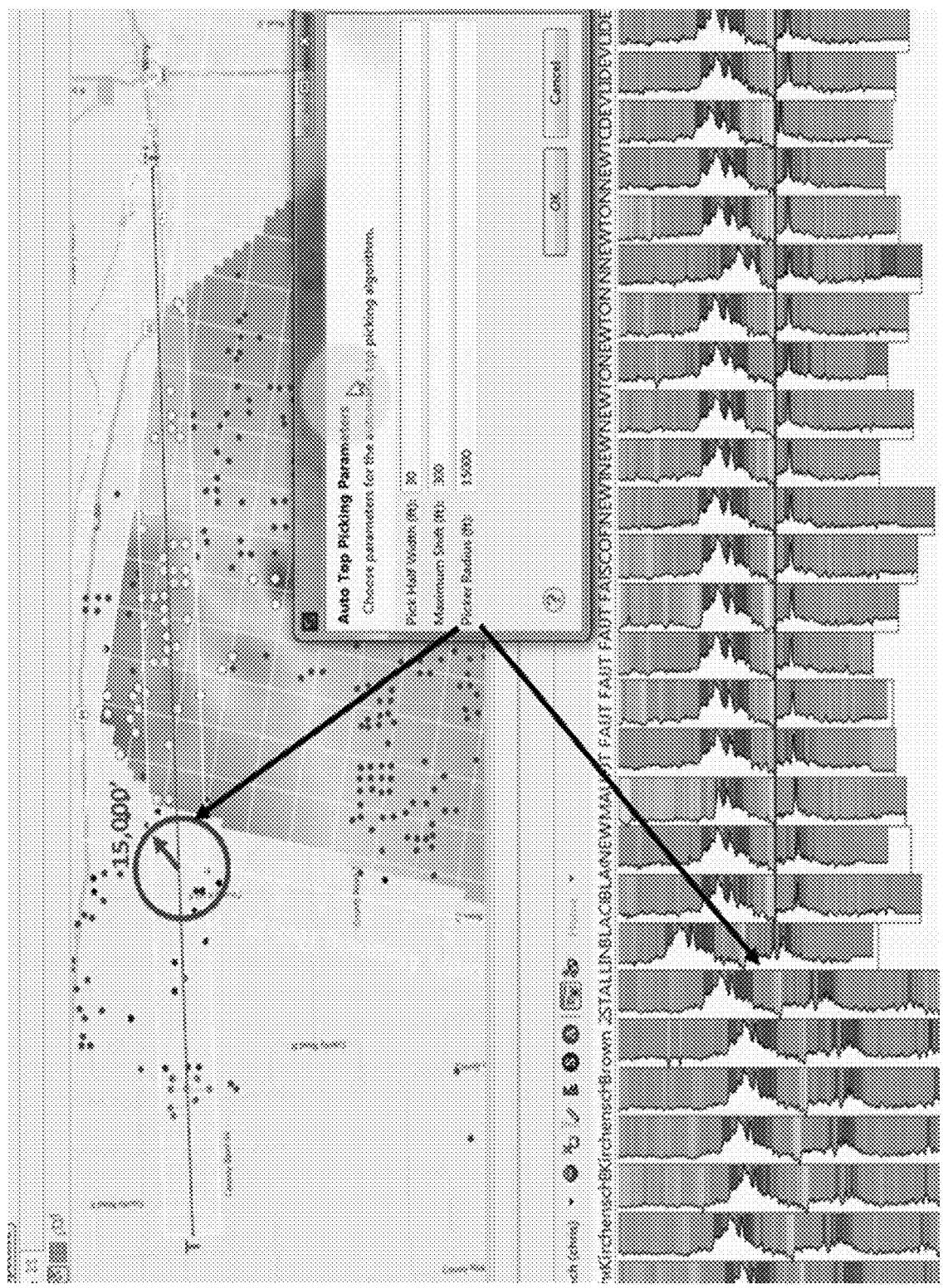
FIG. 7 illustrates an example of a search parameter user interface that may be generated by the GUI module of the system for automatically correlating geologic tops.
Figure 8:
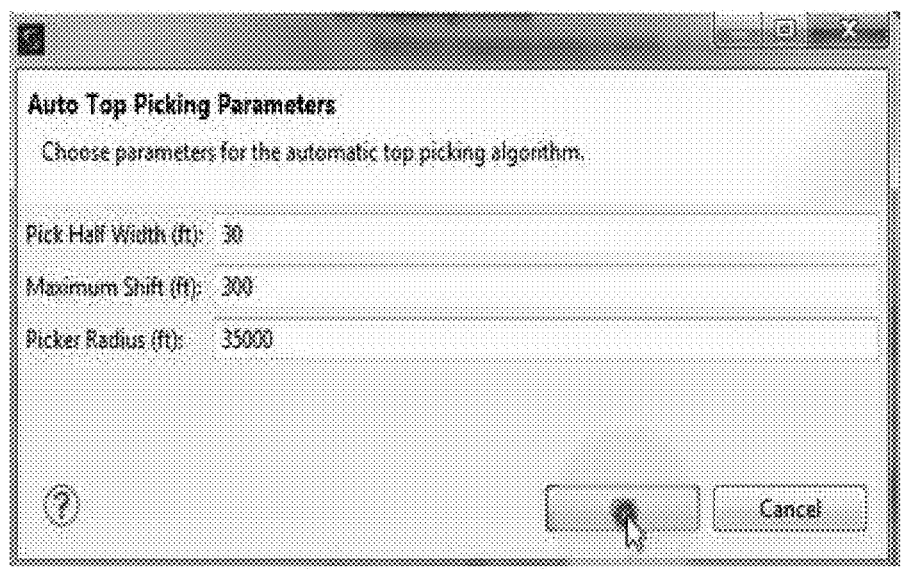
FIGS. 8 and 9 illustrate another example of the search parameter user interface that may be generated by the GUI module of the system for automatically correlating geologic tops.
Figure 9:
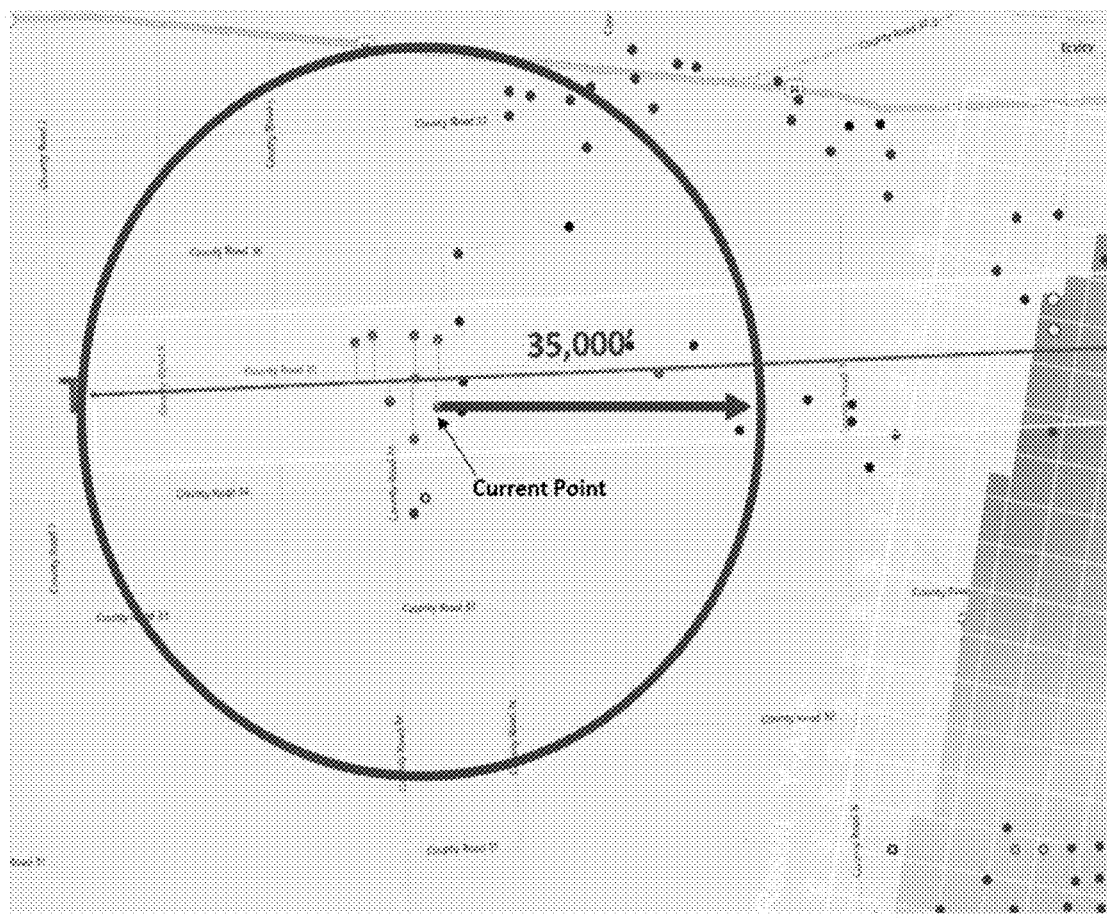

In one embodiment, this method process of locating neighbors may be performed using a full 3D user interface solution as shown in FIG. 7 in which the various well log data (showing the different strata of each well log vertically) for wellbores in a particular area are shown in the bottom part of the user interface to the user along with a 2D map of the area being searched as shown in an upper part of the user interface in FIG. 7. The well top correlation module 418 may also generate a search parameter interface (see dialog box example in FIG. 7) that permits the user to define a radius parameter to the search for the neighbor wells to only consider wells within the search radius, thus eliminating wellbores deemed to be far too away. In the example user interface in FIG. 7, the user has input a 15,000 foot radius search (that appears in the user interface) so that the well top correlation method stopped picking because it could not find wellbores within a 15,000 ft search window selected by the user. FIG. 8 illustrates an example of the user changing the search radius to 35,000 feet and then FIG. 9 shows that, as a result of this change, a number of neighbor wellbores within the larger search radius (shown in FIG. 9) are located that were not located when the search radius was 15,000 feet. Thus, the search radius allows the automated well top correlation to be restricted to a particular area of interest to the user or to wellbores within a particular distance from each other since wellbores that are too far away from the original wellbore should not be considered neighbor wellbores.

The method may then add all manual well picks to a PriorityQueue sorted by a quality measure and poll the priority queue (508). The priority queue may include elements containing an identifier for each well bore in the queue, a confidence value/quality measure for each pick, and any other information for performing the correlation. The queue may be configured as a priority queue based on an element's confidence value. The confidence priority queue may initially contain any seed picks, but as correlation is performed, new elements are added to the confidence priority queue for each pick made by the system according to their confidence value. The well picks in the priority queue may include manual well picks and automatically selected well picks (automatic well picks) selected by the system wherein the manual well picks were selected by the user and have a highest quality measure and the automatic well picks may have a lower quality measure.

The polling of the priority queue may be one well pick at a time. The PriorityQueue will sort the well picks based on a quality measure, so the highest quality well picks, namely manual picks, will be the first to be processed. Note, that these manual well picks are NOT allowed to be written over or their measured depth value re-interpreted. In the method, from the polled well pick, find all neighboring wellbores without a manual well pick (510) using the search tables computed in process 508 above. In the method, only the picks without a manual well pick are eligible to be interpreted. The search space for this process is reduced by the search radius described above.

Figure 15:
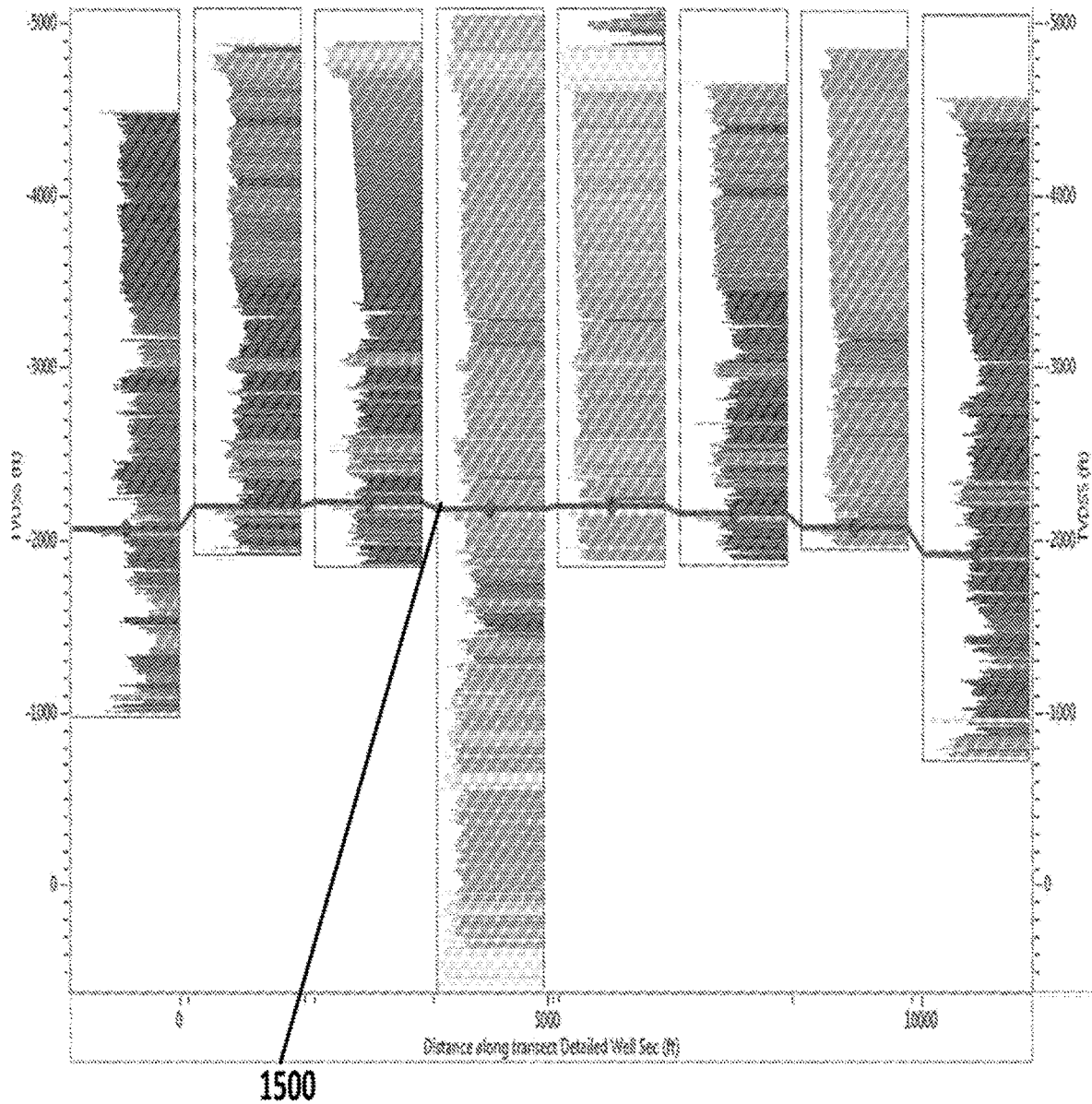
FIG. 15 illustrates an example of a user interface of the system showing the correlated geologic tops.

The method may then obtain a highest quality well bore pair from the priority queue (512). For a given source "SRC"-target "TRG" pairing, a well log segment is obtained from the SRC and TRG wellbores. In the method, if the priority queue is exhausted or empty, then the process for automatic correlation of geologic tops is completed. The end result is that a bunch of Well Picks are created from a very few originals well picks, an example of which is shown in FIG. 15.

If there is a wellbore in the priority queue, the process continues onto performing a correlation between the source and target well picks (516). In this process, a window of data may be selected about the SRC well pick defined by "half-window" input parameters. The correlation may be subsequence dynamic time warping (SDTW) that may be computed between the two SRC and TRG log segments (the neighbors of the pick). Other possible correlation algorithms that may be used include a cross-correlation or a cross correlation while applying systematic shifting, stretching, or squeezing of the source data series to that of the target data series. The correlation may operate by measuring the similarity between two sequences of data. In this case, the correlation may be specifically configured to find a portion of a relatively large sequence of data that most closely resembles a relatively small sequence of data.

For example, when SDWT is applied to well logs, the system may determine which portion of a second well log is most similar to a specific portion of a first well log. This may be done by supplying the system with a "source" sequence of data. The source may be the portion of a well log that is associated with, initially, a manual pick, and performing dynamic time warping with the source data and second well log (the target data) to identify the portion of the second well log that most closely resembles the source. The system may then consider this best match to be a part of the same well top as the one identified by the seed pick. The identified best match may be used at a later time as the source for performing dynamic time warping on other well logs. Thus, SDWT involves finding a sequence in a target that is the most similar to a source. One advantage of dynamic time warping is that it allows for a comparison of two sequences that may vary in time, speed, or distance. This allows for the system to correlate well tops despite the well tops varying in width and depth. One method of performing dynamic time warping is subsequence dynamic time warping. Subsequence dynamic time warping is especially suited for situations where the source is much smaller than the target. An initial cost matrix ($C[i][j]$) of the "distance" between each source or target pairing may be computed. This computation may be described by equation 1:

$$C[i][j] \sum_{n=1}^{nLogs} w_n * (SOURCE[i][n] - TARGET[j][n])^2 \quad (1)$$

for $i = 1, M + 1, j = 1, N$ where $w_n$ is a specified weight of each input well log and source[i] and target[j] are the corresponding well logs for the source and target in a two-dimensional array of size M and N. Any number of local minima may be logged. An accumulated cost matrix may then be computed by accumulating the distances computed in the initial cost matrix. Using the locations of the local minima, the system may then backtrack from the locations of the local minima in the accumulated cost matrix to where the cumulative cost matrix reaches zero. The path taken through the accumulated cost matrix during the backtracking is then saved as the optimal warping path. Further details and examples describing subsequence dynamic time warping can be found in Appendix A that is incorporated herein by reference.

During the correlation, a slope constraint may be used that minimizes the algorithm being caught in "data singularities" that was a significant problem in some algorithms and the algorithm would ultimately end up in poorly picked well picks. See Keogh, E. & M. Pazzani. "Derivative Dynamic Time Warping", In Proc. of the First Intl. SIAM Intl. Conf. on Data Mining, Chicago, Ill. (2001) that is incorporated herein by reference. Three different slope constraint stencils may be used such as for example as described in Sakoe, H. & Chiba, S., "Dynamic programming algorithm optimization for spoken word", Transactions of Acoustics, Speech, and Signal Proc., Vol. ASSP-26. pp. 43-49. (1978) that is incorporated herein by reference. The three stencils used in the SDTW step are the most commonly used stencils reported in the literature and provided a greater freedom for the algorithm to find more optimal solutions.

The Alignment Error calculation of the SDTW step is now computed as a weighted sum of both the amplitude difference of the log curves and also the shape of the curves as by taking the derivative of the log curves and the strength of the optimal path was improved over using either one (amplitude difference or derivatives) by itself. After the SDTW is completed, a local shift refinement is made for each solution to optimize peak-to-peak and trough-to-trough matches. In other words, if the SRC well pick was picked on a peak, the local shift refinement improves the match to optimize well picks falling on peaks that improves the local accuracy of the Well Pick.

The method may now determine a quality measure for the source/target pair (518) in view of the dynamic time warping or other type of correlation. The quality value provides a quality measurement indicating the similarity between the selected target pick and the source. The computation of the quality value for a match may be accomplished using any available method. In on example, the system may compute a quality value for the pick itself and a cumulative confidence value that incorporates the pick that the pick is based on. The cumulative confidence value may be calculated monotonically as a non-increasing function of the cumulative confidence value of the source and the quality value of the current pick. For example, if a pick made by dynamic time warping has a quality value of 0.9 and the source used for making the pick had a confidence value of 0.9, and then the cumulative confidence values may be a combination of the quality and confidence values using a monotonically non-increasing function.

In one example, the system may compute a Pearson quality measure (q) between the source and target. The Pearson quality measure is described by equation 2:

$$q = \frac{\sum_{i=1}^{n}(X_i - \overline{X})(Y_i - \overline{Y})}{\sqrt{\sum_{i=1}^{n}(X_i - \overline{X})^2}\sqrt{\sum_{i=1}^{n}(Y_i - \overline{Y})^2}} \quad (2)$$

where X and Y represent the correlated data sequences entered in the warping function. As stated above, the system may be configured to utilize quality values ranging from 0 to 1. Thus, any negative correlations found may be set to have a value of 0 since we are not interested in inverse correlations A cumulative confidence value for the pick made at the target node may be calculated by acquiring the confidence value of the pick from the source and multiplying it by the quality value of the current target pick. This relationship may be described by equation 3:

$$C(i+1) = C(i) * q(i, i+1) \quad (3)$$

Where $C(i)$ is the confidence value of the source and q is the quality value of the pick. Thus, the cumulative confidence value of a new pick is a function of the confidence value of the source pick. For example, if the confidence value of the source is 0.9 and the quality value of the new pick is 0.9, then the cumulative confidence value may be the product of the two values (0.81).

For example, referring back to FIG. 6, if a seed pick is at node 610, then the correlation will begin at node 610's neighbors, here nodes 611, 613, and 614. The correlation would result in a pick being made at each of the nodes with each pick being assigned a confidence value. These picks are then added to the confidence priority queue. The system then performs correlation on the new highest confidence pick in the queue. For example, if node 613 yields the highest confidence pick, then the pick at node 613 is used for the next round of correlations. The natural neighbors of node 613 include node 611, node 615, and node 614. Correlation between the pick at node 613 is then performed on each natural neighbor (nodes 611, 615, and 614). In this case, the result of the correlation of node 615 is added to the queue, but nodes 611 and 614 have already been correlated and have corresponding picks already present in the queue. When a pick is already in the queue, the confidence of the pick may be compared to the confidence of the new pick. If the new pick has a higher confidence, then the confidence is used to update the confidence of the pick in the queue and the queue is appropriately reordered. If the confidence in the new pick is lower than the corresponding one in the queue, the new pick is discarded.

It should be understood that the use of dynamic time warping, Delaunay triangulation, and a Pearson quality measure, represent a single implementation of the system for automatically correlating geologic tops. Other methods or algorithms may be used instead of the provided methods. The system is configured to measure the similarity between two well logs from neighboring wells. More specifically, the system is configured to identify a portion of a well log that is the most similar to a specified source portion of another well log. This identified portion may then be used as a source for measuring the similarity between the source portion and the well logs of any neighboring wells. Each time a pick has been identified it may be assigned a confidence value. This confidence value may be a function of how similar the identified pick is to the source pick and the confidence value of the source pick. Thus, the confidence value is a monotonically non-increasing cumulative confidence measure. Furthermore, the well log locations may be inputted into a fully or partially-connected graph and any method may be used to determine the neighbors of a well.

For the particular pair (SRC and TRG) of well picks, the method may then compare the quality measure above against a defined quality threshold (520). In one embodiment, the quality must be greater than or equal to 0.9. The iteration scheme relies on high quality matches between each SRC-TRG pair. Allowing matches with low quality can lead to a larger spread with more uncertainty in the measured depths of the picks. The measured depth is a depth measured along the actual wellbore (in which some portion of the wellbore may be somewhat horizontal) so that this depth may be thought of as a total depth/length of the wellbore. The measured depth may be contrasted with the true vertical depth that is a depth of the wellbore down from the well head on the surface of the earth.

In one implementation, the three different candidate Well Picks may be tested for passing a quality threshold and if they pass, the well picks are placed in a list of potential candidate solutions for the current neighboring well (522). Further, the method may determine if any of these picks meet the threshold quality constraint, then this current neighbor wellbore passes the test and is placed on the priority queue (524) for further consideration resulting from a different wellbore-to-wellbore pathway. The method, each candidate well pick(s) for a given wellbore may be statistically tested (526) against a defined depth-window tolerance (as described above) to determine if one can be picked as a "true" automated well pick versus one that is then placed on the priority queue for further consideration as described above. The method may then identify a candidate final well pick (528) if the well pick has more than 2 wellbore sources that comprise it, and the resulting measured depths of its candidate solutions have a statistical variance that is <=to a defined depth tolerance.

Figure 11:
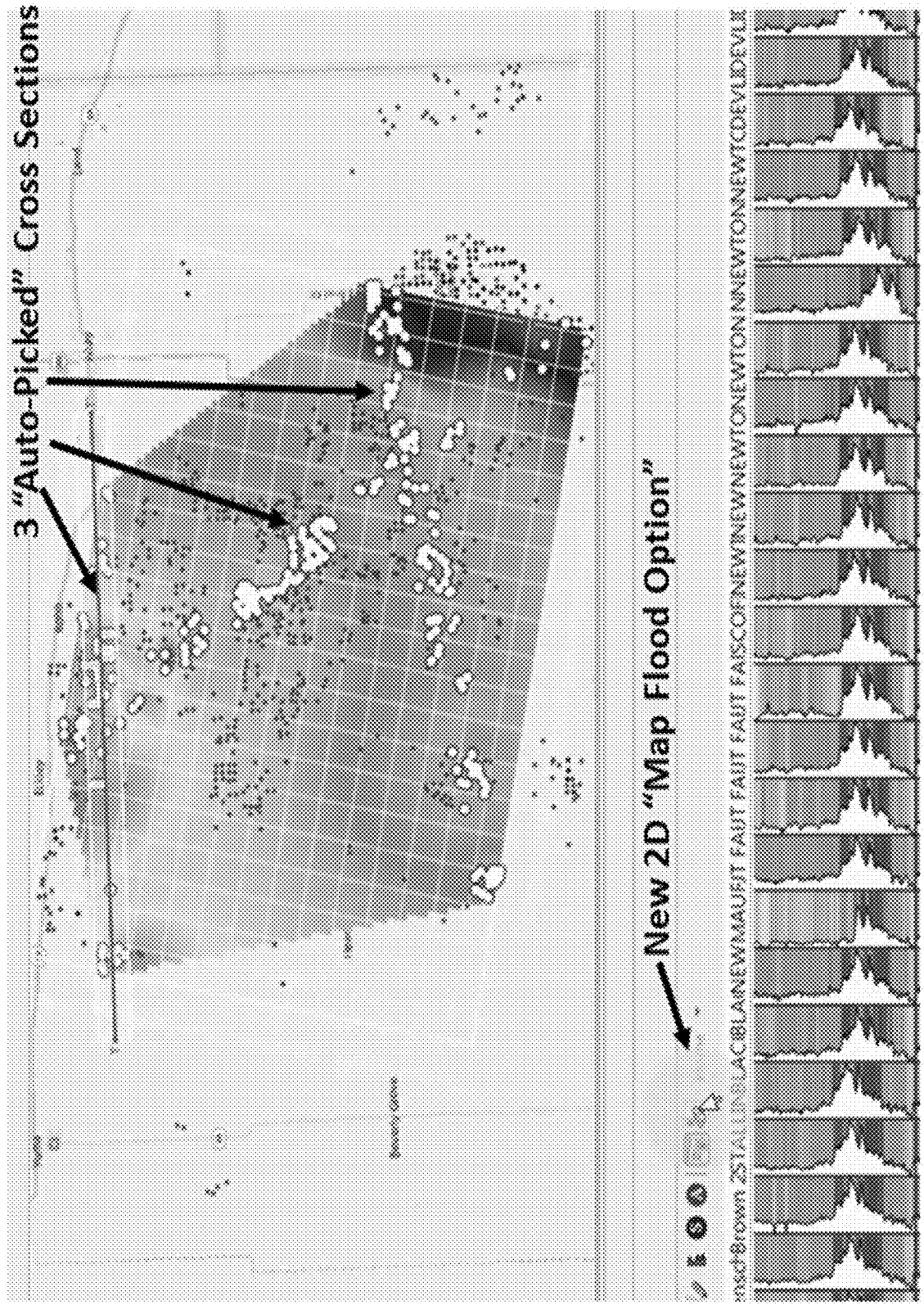
FIG. 11 illustrates an auto wellbore selection user interface that may be generated by the GUI module of the system for automatically correlating geologic tops.

FIG. 11 illustrates an example of a 2D map flood user interface that may be generated by the GUI module of the system for automatically correlating geologic tops. In this user interface, the system and method for automatic correlation of geologic well tops may auto-pick, or "flood," a region of wellbores selected on the 2D basemap seeded by previous well picks from the auto-picked cross sections as shown in FIG. 10.

Figure 12:
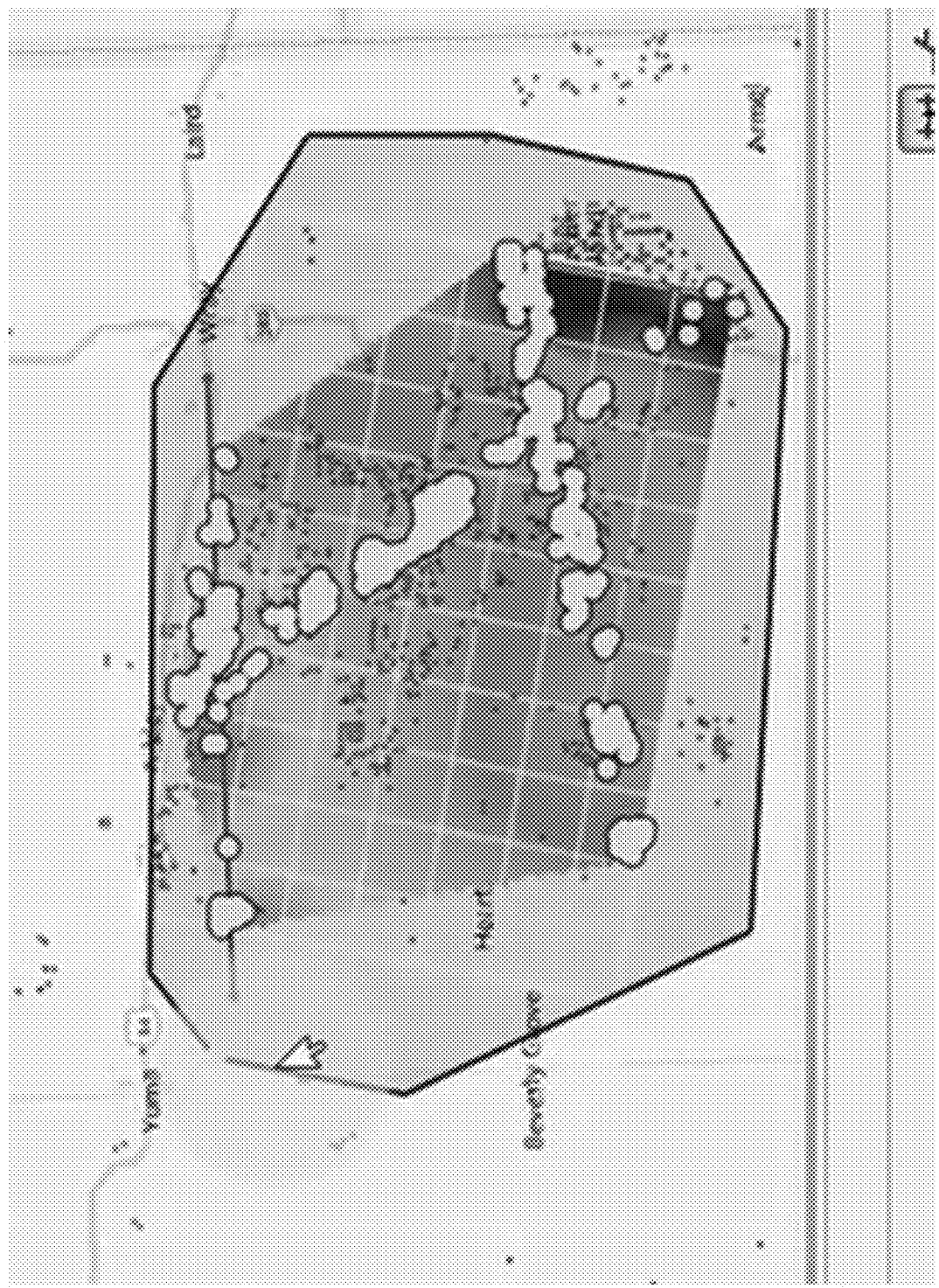
FIG. 12 illustrates a wellbore selection user interface that may be generated by the GUI module of the system for automatically correlating geologic tops.

FIG. 12 illustrates an auto wellbore selection user interface that may be generated by the GUI module of the system for automatically correlating geologic tops. In this user interface, a user may situate the basemap to the current correlation area and then draws a polygon around the set of wellbores they wish to use for the correlation as shown in FIG. 12. The polygon should then be drawn such that it covers the area they wish to pick over and yet include manual picks to seed this picker. If no manual picks are included in the polygon, the user will be warned.

Figure 13:
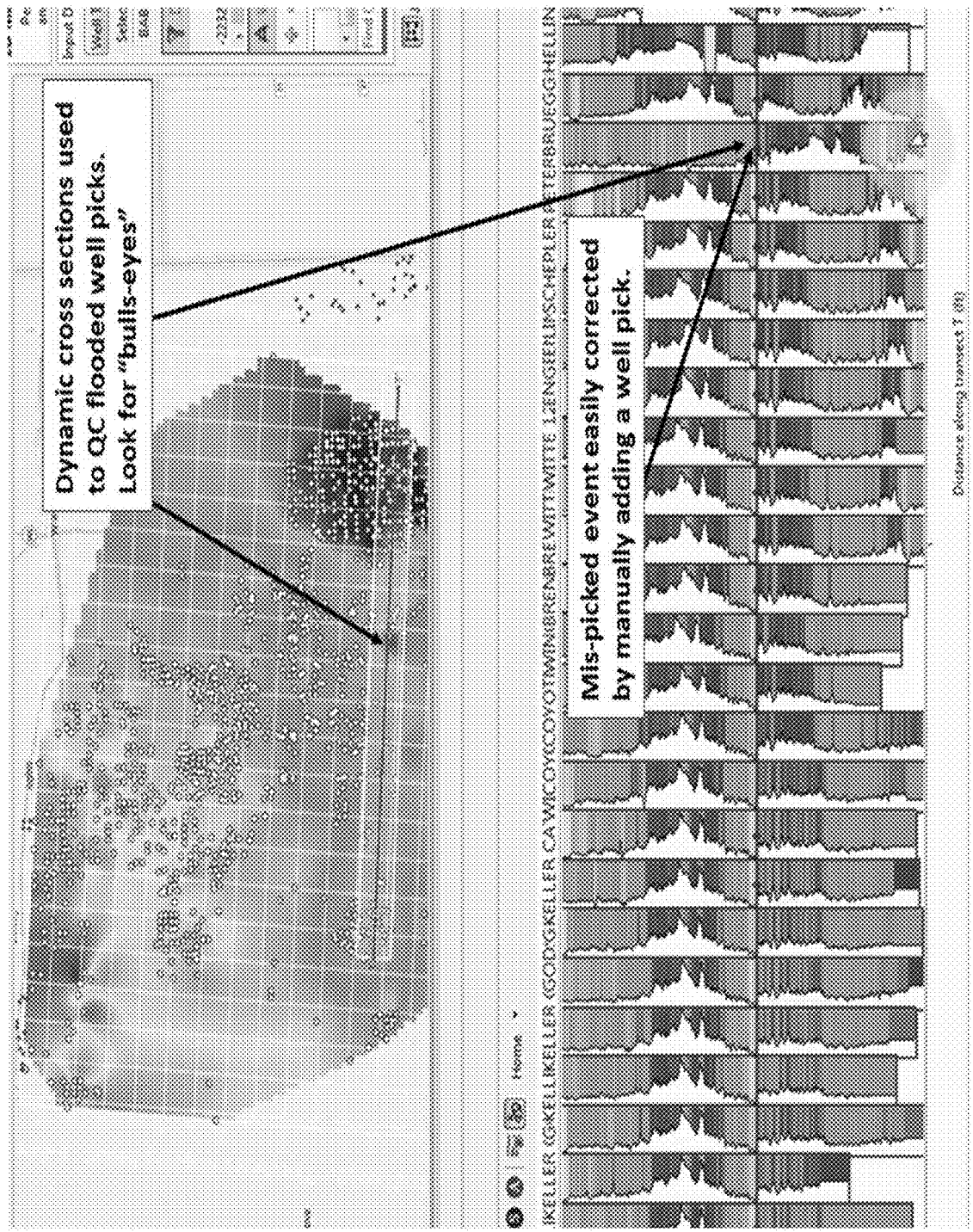
FIG. 13 illustrates another wellbore selection user interface that may be generated by the GUI module of the system for automatically correlating geologic tops.

FIG. 13 illustrates another wellbore selection user interface that may be generated by the GUI module of the system for automatically correlating geologic tops. Using this user interface, a user can quality control the gridded horizon on the basemap and also investigate the number of wells that have been correlated by the white control points on the gridded surface. The final step is to now check the results after the algorithm has been run over the wellbores selected on the basemap. A dynamic transect is moved around on the basemap and the "Base of A Bench" top is flattened on the corresponding cross section. The user should be looking for bulls-eyes around wells most likely indicating the well pick was mis-picked on another geologic event. For example, here, the Base A Bench is clearly mis-picked at the base of the next highest sand. The pick is simply manually picked at its correct location and re-gridded to move the bulls-eye.

Figure 14:
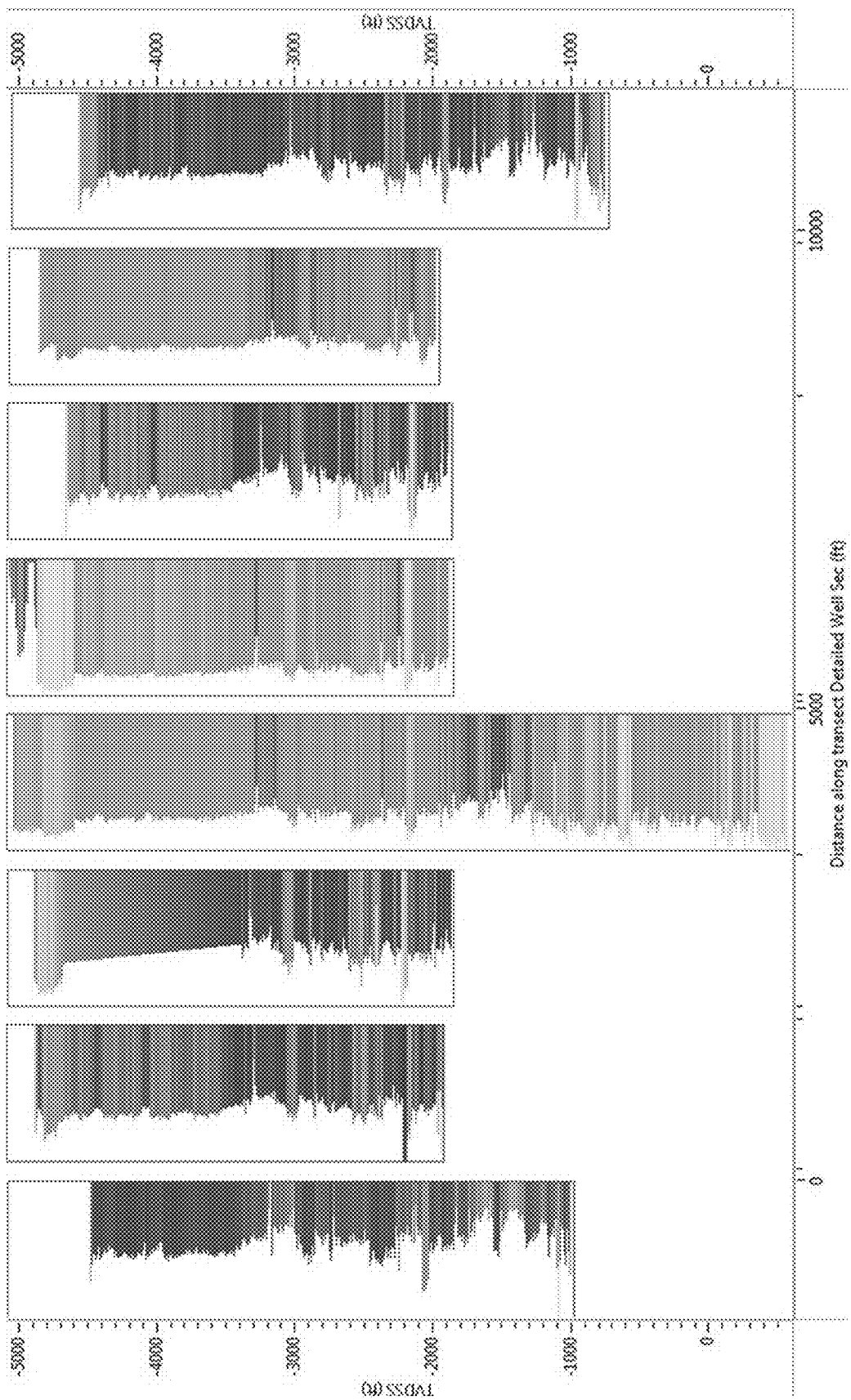
FIG. 14 illustrates an example of the well log data before the automatic correlation process.

FIG. 14 illustrates an example of the well log data before the automatic correlation process. The user interface in FIG. 14 displays a plurality of well logs with the different geologic formations for each well bore. As shown in the figure, the different well logs have different depths. FIG. 15 illustrates an example of a user interface of the system showing the correlated geologic tops. With the well logs in FIG. 14 input into the system and method described above, a result of that process is a set of geologic tops that are correlated. In the example in FIG. 15, the set of geologic tops are shown by a line 1500 superimposed over the well logs that connect that geologic formations. Note that the correlated geologic tops are at more or less the same depth for each well bore, but each well bore has different depths.

The description above includes example systems, methods, techniques, instruction sequences, and/or computer program products that embody techniques of the present disclosure. However, it is understood that the described disclosure may be practiced without these specific details. In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette), optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include an/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

The invention claimed is:

1. A method for automatically correlating geologic tops using at least one processor, the method comprising:
   receiving, at the at least one processor, a plurality of well logs including a first well log of a first well bore and at least a second well log of a second well bore, each well log for each well bore being a record of a plurality of geologic formations penetrated by the well bore along a depth of the well bore;
   constructing, by the at least one processor, a graph of the plurality of well logs, the graph having a node at each well bore location for each well log and an edge between two nodes weighted based on a distance between the two well bores represented by the two nodes;
   determining, using the graph and the at least one processor, at least one neighbor well log for each well log;
   generating, by the at least one processor, a priority queue that contains the plurality of well logs and at least one neighbor well log sorted by a quality measure indicating a similarity between the two well logs of the pair of well logs;
   selecting, by the at least processor, a pair of well logs from the priority queue having a highest quality measure, wherein the selected pair of well logs includes a source well log pick and at least one neighbor well log;
   performing, using the at least one processor, an automatic correlation of the selected pair of well logs, the automatic correlation having a slope constraint;
   generating, using the at least one processor, the quality measure for the pair of well logs;
   determining, using the at least one processor, that the quality measure for the pair of well logs is more than a threshold to identify a candidate well pick of the at least one neighbor well log, where the threshold comprises a defined numeric value and identifying the candidate well pick comprises statistically testing the candidate well pick log against a depth-window tolerance about the source well log pick to identify the candidate well pick as a final well pick, and the final well pick has more than two wellbore sources and the measured depths of the candidate well pick has a statistical variance less than the depth-window tolerance; and based on the determination that the quality measure for the pair of well logs is more than the threshold, displaying the set of correlated geologic tops candidate well pick.

2. The method of claim 1, wherein determining the at least one neighbor well log further comprises performing a neighboring tree search.

3. The method of claim 2, wherein performing a neighboring tree search further comprises adding each well log to a complete weighted graph, wherein each well log is represented by a vertex, and each edge weight represents a distance between a first well log and a second well log and determining at least one neighbor for each vertex using Delaunay triangulation.

4. The method of claim 1, wherein generating the quality measure further comprises generating a Pearson quality measure.

5. The method of claim 4, wherein generating the Pearson quality measure further comprises calculating:

$$q = \frac{\sum_{i=1}^{n}(X_i - \overline{X})(Y_i - \overline{Y})}{\sqrt{\sum_{i=1}^{n}(X_i - \overline{X})^2}\sqrt{\sum_{i=1}^{n}(Y_i - \overline{Y})^2}}$$

where X and Y represent the correlated data sequences entered in a warping function.

6. The method of claim 1, wherein determining at least neighbor well log further comprises providing a search radius to limit a range of well logs that is neighbor of the well log.

7. The method of claim 1, wherein performing correlation further comprises performing dynamic time warping on each neighbor of the well log.

8. A method for automatically correlating geologic tops using at least one processor, the method comprising:
receiving a plurality of well logs including a first well log of a first well bore and at least a second well log of a second well bore, each well log for each well bore being a record of a plurality of geologic formations penetrated by the well bore along a depth of the well bore;
constructing a graph of the plurality of well logs, the graph having a node at each well bore location for each well log and an edge between two nodes weighted based on a distance between the two well bores represented by the two nodes;
determining, using the graph, at least one neighbor well log for each well log;
placing the well logs including the at least one neighbor well log into a priority queue sorted by a quality measure indicating a similarity between a source well log pick and the at least one neighbor well log of a pair of well logs;
traversing the priority queue until the queue is empty by retrieving a first element from the priority queue having a highest quality measure, determining a new pick by performing correlation on each neighbor of the first element using a slope constraint that minimizes data singularities during the correlation, assigning the new pick a pick quality value, adding the new pick to the priority queue and generating a candidate well pick, wherein adding the new pick to the priority queue comprises adding the new pick to the priority queue when a quality value of the pick exceeds a quality threshold that comprises a defined numeric value and when the candidate well pick is statistically tested against a depth-window tolerance about the source well log pick to identify the candidate well pick as a final well pick and the final well pick has more than two wellbore sources and the measured depths of the candidate well pick has a statistical variance less than the depth-window tolerance; and
displaying the set of correlated geologic tops candidate well pick.

9. The method of claim 8, wherein the quality value of the pick is determined by:

$$q = \frac{\sum_{i=1}^{n}(X_i - \overline{X})(Y_i - \overline{Y})}{\sqrt{\sum_{i=1}^{n}(X_i - \overline{X})^2}\sqrt{\sum_{i=1}^{n}(Y_i - \overline{Y})^2}}$$

where X and Y represent the correlated data sequences entered in a warping function.

10. The method of claim 8, wherein determining at least one neighbor for each well log comprises:
adding each well log to a complete weighted graph, wherein each well log is represented by a vertex, and each edge weight represents a distance between a first well log and a second well log; and
determining at least one neighbor for each vertex using Delaunay triangulation.

11. The method of claim 8, wherein the quality value is determined using a Pearson quality measure.

12. The method of claim 8, wherein performing correlation further comprises performing dynamic time warping on each neighbor of the well log.

13. An apparatus, comprising:
a computer system having at least one processor, memory and a plurality of lines of computer code that is configured to:
receive a plurality of well logs including a first well log of a first well bore and at least a second well log of a second well bore, each well log for each well bore being a record of a plurality of geologic formations penetrated by the well bore along a depth of the well bore;
construct a graph of the plurality of well logs, the graph having a node at each well bore location for each well log and an edge between two nodes weighted based on a distance between the two well bores represented by the two nodes;
determine, using the graph, at least one neighbor well log for each well log;
generate a priority queue that contains the plurality of well logs and at least one neighbor well log sorted by a quality measure indicating a similarity between the two well logs of the pair of well logs;
select a pair of well logs from the priority queue having a highest quality measure, wherein the selected pair of well logs includes a source well log pick and at least one neighbor well log;

perform an automatic correlation of the selected pair of well logs, the automatic correlation having a slope constraint;

generate the quality measure for the pair of well logs;

determine that the quality measure for the pair of well logs is more than a threshold to identify a candidate well pick, where the threshold comprises a defined numeric value;

statistically test the candidate well pick log against a depth-window tolerance about the source well log pick to identify the candidate well pick as a final well pick, and the final well pick has more than two wellbore sources and the measured depths of the candidate well pick has a statistical variance less than the depth-window tolerance; and based on the determination that the quality measure for the pair of well logs is more than the threshold, displaying the set of correlated geologic tops candidate well pick.

14. The apparatus of claim 13, wherein the computer system is configured to perform a neighboring tree search to determine the at least one neighbor well log.

15. The apparatus of claim 14, wherein the computer system is configured to add each well log to a complete weighted graph, wherein each well log is represented by a vertex, and each edge weight represents a distance between a first well log and a second well log and determine at least one neighbor for each vertex using Delaunay triangulation to perform the neighboring tree search.

16. The apparatus of claim 13, wherein the computer system is configured to generate a Pearson quality measure.

17. The apparatus of claim 16, wherein the computer system is configured to calculate:

$$q = \frac{\sum_{i=1}^{n}(X_i - \overline{X})(Y_i - \overline{Y})}{\sqrt{\sum_{i=1}^{n}(X_i - \overline{X})^2}\sqrt{\sum_{i=1}^{n}(Y_i - \overline{Y})^2}}$$

where X and Y represent the correlated data sequences entered in a warping function.

18. The apparatus of claim 13, wherein the computer system is configured to provide a search radius to limit a range of well logs that is neighbor of the well log.

19. The apparatus of claim 13, wherein the computer system is configured to perform dynamic time warping on each neighbor of the well log for correlation.

20. The apparatus of claim 13, wherein the computer system is configured to add each well log to a complete weighted graph, wherein each well log is represented by a vertex, and each edge weight represents a distance between a first well log and a second well log and determine at least one neighbor for each vertex using Delaunay triangulation.

21. The apparatus of claim 13, wherein the computer system further comprises one of a computer and one or more computing resources.

22. The apparatus of claim 21, wherein the one or more computing resources are one of one or more server computing devices and one or more cloud computing resources.

23. The apparatus of claim 22 further comprising a computing device used a user to access the one or more server computing devices.

24. The method of claim 1, wherein the defined numeric value is between at least 0.9 and 1.

* * * * *